United States Patent [19]
Martin et al.

[11] Patent Number: 6,078,936
[45] Date of Patent: Jun. 20, 2000

[54] PRESENTING AN IMAGE ON A DISPLAY AS IT WOULD BE PRESENTED BY ANOTHER IMAGE OUTPUT DEVICE OR ON PRINTING CIRCUITRY

[75] Inventors: Russel A. Martin, Menlo Park; Richard H. Bruce, Los Altos; Alan G. Lewis, Sunnyvale; Kathryn M. Middo, Cupertino; Malcolm J. Thompson, Palo Alto; William D. Turner, San Marino, all of Calif.

[73] Assignee: Xerox Corporation, Stamford, Conn.

[21] Appl. No.: 08/679,169

[22] Filed: Jul. 12, 1996

Related U.S. Application Data

[63] Continuation of application No. 08/235,017, Apr. 28, 1994, abandoned.

[51] Int. Cl.$^7$ .............................. G06F 3/147; G06F 3/12; G06F 17/21; G06K 15/00
[52] U.S. Cl. .............................. 707/527; 345/3; 345/132; 358/1.18
[58] Field of Search ....................... 345/3, 60, 132–133, 345/339–40, 347–8, 352, 418–419, 428, 439; 382/299; 358/1.18; 707/527

[56] References Cited

U.S. PATENT DOCUMENTS

| | | | |
|---|---|---|---|
| 4,174,175 | 11/1979 | DiMaria | 358/44 |
| 4,491,933 | 1/1985 | Ursin et al. | 707/527 |

(List continued on next page.)

FOREIGN PATENT DOCUMENTS

| | | |
|---|---|---|
| 534871A3 | 3/1993 | European Pat. Off. . |
| 9007837 | 7/1990 | WIPO . |
| 9210791 | 6/1992 | WIPO . |

OTHER PUBLICATIONS

Anonymous, "Mapping bit Manipulation Program for Display Screens Using Different Resolutions", International Business Machines Technical Disclosure Bulletin, v. 30, n. 11, pp. 73–78, Apr. 1988.

Anonymous, "Liquid Crystal Display for Color Matching", International Business Machines Technical Disclosure Bulletin, v. 34, n. 10B, pp. 353–354 (reprinted 3 pages), Jan. 1992.

Anonymous, "Dynamic Determination of Font Resolution when Storing/Locating Fonts", International Business Machines Technical Disclosure Bulletin, v. 36, n. 8, pp. 353–354, Aug. 1993.

Malcolme–Lawes, D.J., "High–Resolution Dumps to Matrix Printers", Laboratory Microcomputer, v. 5, n. 2, abstract only, p. 41, Jan. 1986.

Worlton, T., "Imprint: VAX Printing Made Simple", National Technical Information Service Report No. ANLIPNS/PP–79234, p. 28 (abstract only), Jan. 1994.

(List continued on next page.)

*Primary Examiner*—Mark R. Powell
*Assistant Examiner*—Jeffrey Allen Rossi
*Attorney, Agent, or Firm*—James T. Beran

[57] ABSTRACT

A display has sufficient resolution to present images as they would appear on other types of image output devices, such as types of printers or displays. In response to a user signal indicating a type of image output devices, data defining an image is used to automatically obtain version data defining a version of the image. The version can be presented on the display to show the image as it would appear when presented by an image output device of the indicated type. The user can indicate a type by selecting a menu item or a button or by providing a sequence of keystrokes. In response to a user signal indicating a parameter value, a version can be presented showing the image as it would appear when presented with the value. When a satisfactory image is displayed, the user can then request presentation of the image by a device of the indicated type. Either data defining the input image from which the displayed image is a version or data defining the currently displayed image can then be transformed to obtain a presentation version for the image output device. A copier or printer that includes the display can use it to perform print previewing.

39 Claims, 13 Drawing Sheets

U.S. PATENT DOCUMENTS

| | | | |
|---|---|---|---|
| 4,495,490 | 1/1985 | Hopper et al. | 345/194 |
| 4,588,282 | 5/1986 | Levine | 358/473 |
| 4,613,945 | 9/1986 | Parker | 345/195 |
| 4,616,269 | 10/1986 | Mori | 358/496 |
| 4,655,577 | 4/1987 | Ikuta | 346/74.2 |
| 4,656,524 | 4/1987 | Norris et al. | 358/401 |
| 4,677,571 | 6/1987 | Riseman et al. | 358/1.13 |
| 4,714,940 | 12/1987 | Inoue et al. | 399/6 |
| 4,740,814 | 4/1988 | Folkins | 399/15 |
| 4,800,510 | 1/1989 | Vinberg et al. | 345/440 |
| 4,825,296 | 4/1989 | Wagensonner et al. | 358/443 |
| 4,839,829 | 6/1989 | Freedman | 358/1.15 |
| 4,951,233 | 8/1990 | Fujiwara et al. | 345/115 |
| 4,979,032 | 12/1990 | Alessi et al. | 358/527 |
| 5,029,107 | 7/1991 | Lee | 345/132 |
| 5,163,122 | 11/1992 | Urabe et al. | 358/1.9 |
| 5,164,842 | 11/1992 | Gauronski et al. | 358/401 |
| 5,208,903 | 5/1993 | Curry | 395/131 |
| 5,210,824 | 5/1993 | Putz et al. | 707/527 |
| 5,239,389 | 8/1993 | Kochis et al. | 358/451 |
| 5,257,097 | 10/1993 | Pineau et al. | 358/500 |
| 5,278,678 | 1/1994 | Harrington | 345/149 |
| 5,301,037 | 4/1994 | Kang et al. | 358/451 |
| 5,304,988 | 4/1994 | Seto | 382/224 |
| 5,309,257 | 5/1994 | Bonino et al. | 345/431 |
| 5,313,278 | 5/1994 | Duenyas et al. | 358/527 |
| 5,367,673 | 11/1994 | Goldsmith et al. | 707/104 |
| 5,384,901 | 1/1995 | Glassner et al. | 345/431 |
| 5,416,890 | 5/1995 | Beretta | 345/431 |
| 5,420,979 | 5/1995 | Madden et al. | 345/501 |
| 5,436,730 | 7/1995 | Hube | 358/401 |
| 5,491,347 | 2/1996 | Allen et al. | 257/59 |
| 5,511,149 | 4/1996 | Hayano | 358/1.15 |
| 5,519,501 | 5/1996 | Hamilton | 358/296 |
| 5,559,530 | 9/1996 | Yamashita et al. | 345/136 |
| 5,598,520 | 1/1997 | Harel et al. | 358/1.2 |
| 5,604,843 | 2/1997 | Shaw et al. | 358/1.15 |
| 5,627,662 | 5/1997 | Holmes et al. | 358/474 |
| 5,631,974 | 5/1997 | Lau-Lee et al. | 382/132 |
| 5,703,621 | 12/1997 | Martin et al. | 345/147 |
| 5,731,823 | 3/1998 | Miller et al. | 358/1.13 |
| 5,739,928 | 4/1998 | Scott | 358/520 |
| 5,745,156 | 4/1998 | Federico et al. | 347/256 |
| 5,970,225 | 10/1999 | Jackson et al. | 358/1.18 |

OTHER PUBLICATIONS

Anonymous, "Displaying TeX Files on Graphics Terminals: Prieviewing of Printout Saves Time", National Technical Information Service Report No. NTN90–1032, abstract only), p. 1, Dec. 1990.

Sabotka, W.K., "Print Quality Test Target: Developed to Test Postscript Printers", Proc. Society for Optical Engineering (SPIE), v. 1670, p. 486 (abstract only), Feb. 1992.

Phillips Jr, J. Professional Presentations, Records Management Quarterly, v. 28, pp. 44–46 (reprinted) Oct. 1994.

Thurber Jr, K. "The ABC's of Printers", Popular Electronics, v. 11, pp. 43 (5 pages, reprinted) Apr. 1994.

Eliezer, C., "Report from Digital '93: the Year of the Sourceless Image?", The Seybold Report on Publishing Systems, v. 22, n. 13, pp. 3–10, Mar. 1993.

ColorSync Utilities Developer Note, *Developer Technical Publications, Apple Computer, Inc*, 1993.

Martin, R., Chuang, T., Steemers, H., Allen, R., Stuber, S., Lee D., Young, M., Ho, J., Nguyen, M., Meuli, W., Fiske, T., Bruce, R., Thompson, M., Tilton, M., and Silverstein, L.D., "P–70: A6.3–Mpixel AMLCD," *SID 93 Digest*, 1993, pp. 704–707.

Martin, R., Chuang, T.–C., Steemers, H., Allen, R., Fulks, R., Stuber, S., and Tilton, M., "The Liquid Crystal Laser Print', a 6.3 Million Pixel Monochrome AMLCD", submitted to program committee of Society for Information Display for review on or about Feb. 12, 1993.

Silverstein, L.D., Krantz, J.H., Gomer, F.E., Yeh, Y–Y., and Monty, R.W., "Effects of spatial sampling and luminance quantization on the image quality of color matrix displays," *Journal of the Optical Society of America A*, vol. 7, No. 10, Oct. 1990, pp. 1955–1968.

Silverstein, L.D., Gomer, F.E., Yeh, Y–Y., and Krantz, J.H., "Empirical Studies of Color Matrix Display Image Quality," *Applied Vision, 1989 Technical Digest Series*, vol. 16, 1989, pp. 152–157.

Gomes, L., "Advanced computer screens have age–old rival," San Jose Mercury News, Feb. 21, 1994, pp. 1E and 9E.

Suenaga, Y., "Some Techniques for Document and Image Preparation," *Systems and Computers in Japan*, vol. 17, No. 3, 1986, pp. 35–46.

*Microsoft Word User's Guide*, Microsoft Corp., 1993–1994, pp. 21–26 and 512–514.

Beretta, G.B., "Method for Estimating Color Gamut Mapping on a Display Device," *Xerox Disclosure Journal*, vol. 17, No. 3, May/Jun. 1992, pp. 171–174.

PRESENTING AN IMAGE ON A DISPLAY AS IT WOULD BE PRESENTED BY ANOTHER IMAGE OUTPUT DEVICE OR ON PRINTING CIRCUITRY

This is a continuation of application Ser. No. 08/235,017, filed Apr. 28, 1994, now abandoned.

BACKGROUND OF THE INVENTION

The present invention relates to image presentation techniques.

Norris et al., U.S. Pat. No. 4,656,524, describe an electronic imaging copier for making enhanced photographic copies of types of photographs. The copier initially operates in a preview display mode during which the operator may view and interactively make selected modifications to an electronic image of the photograph displayed on a display screen. Thereafter, the copier operates in a copy mode to make an enhanced photographic print of the displayed image.

As shown and described in relation to FIGS. 1–8 of Norris et al., the copier has a preview display window through which an electronic image displayed on a CRT can be viewed. In front of the preview display window are operator actuable switch buttons and control knobs that allow the operator to interactably provide selected input signals to the copier for making selected modifications to the image displayed on the CRT and for controlling the mode and sequence of operation of the copier. A displayed image may be modified in terms of format (cropping or scrolling), image size (zoom capability), brightness, and contrast.

The copier also includes optical means for forming an image of a print or transparency at an image plane where the optical image is sensed and converted into electronic image signals by a photoresponsive device such as a CCD that is adapted to scan across the image a line at a time. Electronic image signals are sent to a signal processing apparatus with first and second signal processors.

The first signal processor has a frame buffer that stores image signals representative of an initial low resolution scan of the image; these signals are also sent to a video generator for the CRT so the operator may view the image. Then the first signal processor responds to operator actuable input signals from the buttons and knobs by modifying the image signals in the frame buffer to change image parameters such as magnification, format, contrast, and brightness. The operator provides a modification input signal and the modified image is displayed on the CRT until the operator is satisfied with the results and then initiates a copy cycle by actuating a print button.

The signal processing apparatus incorporates the final modifications into the electronic image signals provided during subsequent scans made for image enhancement and copying purposes. Various techniques for electronic manipulating signals defining an image are shown and described in relation to FIGS. 10 and 11. Col. 11 lines 32–42 describe image enhancement techniques that may be incorporated into the copier. Operations of the second signal processor are described in relation to FIG. 9.

Folkins, U.S. Pat. No. 4,740,814, describes techniques for previewing in an electrophotographic printing machine. As shown and described in relation to FIGS. 1 and 2, a CCD array, in response to a light image, generates an electrical video image corresponding to an original document. A CPU can adjust the electrical video image to correspond with changes transmitted from a control panel, and can then transmit the adjusted electrical video image to a cathode ray tube (CRT) of liquid crystal display. The CRT can also display the unadjusted copy that corresponds to the original document.

Microsoft Word and other commercially available text or graphics editing software products present images on a display that resemble images that can be printed. A user can provide signals, such as through a keyboard and a mouse, requesting changes in the presented images. A user can also request printing of a presented image. In Word, a menu item can be selected to display a print preview, showing a reduced scale version of a document.

SUMMARY OF THE INVENTION

One aspect of the invention deals with a basic problem in preparing an image for presentation. The image could be presented by a variety of different types of image output devices, including various types of printers, displays, and so forth. As used herein, a "type of image output devices" is a set of similarly structured image output devices, each of which responds to data defining an image by performing substantially the same operations so that the image is presented in substantially the same way. An image presented by a properly functioning image output device of a type should be perceptible as substantially identical to the same image presented by other properly functioning image output devices of the same type, subject to uncontrolled variations between devices such as wear and tear, temperature, humidity, toner composition, and so forth.

Devices of each type can typically present an image in numerous ways, with variations in brightness and darkness, in contrast, in paper color or size, and so forth. The appearance of the image may differ substantially depending on which type of devices presents it and how devices of that type operate in making the presentation. A human preparing the image for presentation may find it difficult or impossible to view the image presented by a specific type of image output devices operating in a particular way and may therefore be unable to visualize the image as it would be presented by devices of that type operating in that way.

The invention provides a group of techniques that alleviate the problem of visualizing how a specific device operating in a particular way would present an image. The techniques employ a display with sufficient resolution to present images as they would appear when presented on another type of image output devices. Each technique uses data defining a starting image to obtain data defining a version of the starting image that can be presented on the display to show the starting image as it would appear when presented by an image output device of another type. Each technique provides the data defining the version to the display so that the display presents the version of the starting image, showing the starting image as it would appear when presented by an image output device of the other type.

A first technique allows a user to indicate a type of image output devices; in response, the first technique presents an image on a display as the image would appear when presented by a device of the indicated type. A second technique allows a user to indicate a change in a user-changeable parameter of a type of image output devices; in response, the second technique presents an image on a display as the image would appear when presented by a device of the indicated type with the changed parameter. Third and fourth techniques present a version of an image on an image output device that appears substantially identical to a displayed version of the image: The third technique uses the data defining the image from which the displayed image was obtained. The fourth technique uses the data defining the displayed version of the image. Both the third and fourth techniques obtain data defining another version that can be presented on the device and that has a substantially identical appearance when presented as the displayed image.

The first technique receives a signal from a user indicating a first type of image output devices. In response, the first technique uses the data defining a starting image to automatically obtain device version data defining a version of the starting image as it would appear when presented by the first type of devices. The first technique then provides the device version data to the display, which presents the version of the starting image as it would appear when presented by the first type of devices.

The user could indicate the first type of device in any appropriate way. For example, the user could provide keystrokes indicating the first type of device. Or the user could select a menu item presented on a display. Or the user could select one of a set of buttons presented on a display. The first technique could be implemented iteratively so that the user could indicate a type of devices during each iteration, and each iteration would present a version for its indicated type.

The types of image output devices can include printers and displays, including, for example, cathode ray tube (CRT) displays, liquid crystal displays (LCDs), and projectors.

The second technique receives a signal from a user indicating a change in a user changeable parameter of a first type of image output devices. In response, the second technique obtains changed parameter data indicating a value of the user changeable parameter resulting from the change indicated by the signal. Like the first technique, the second technique automatically obtains device version data and provides the device version data to a display that presents the version of the starting image as it would appear when presented by the indicated type of device. In addition, the second technique uses the changed parameter data to obtain the device version data; the device version shows a version of the starting image that can be presented on the display to show the starting image as it would appear when presented by an image output device of the first type with the indicated value of the user changeable parameter.

For the third and fourth techniques, the system includes an image output device of the first type. Like the first technique, the third and fourth techniques each automatically obtain device version data and provide the device version data to a display that presents the version of the starting image as it would appear when presented by the first type. In addition, the third technique uses the data defining the starting image to obtain output image data defining an output version of the starting image for presentation by the image output device; similarly, the fourth technique uses the device version data to obtain output image data defining an output version of the starting image for presentation by the image output device. The third and fourth techniques both provide the output image data to the image output device, which presents a version that is substantially identical to the version presented by the display.

Another aspect of the invention solves a problem that arises in printing an image that has been prepared using a display. A user can prepare an image that has a desired appearance when presented on the display, but if the user then requests that the image be printed, the resulting printed image may have a significantly different appearance than the displayed image.

The invention solves the problem of different displayed and printed appearances by providing a technique that uses the data defining the displayed version of the image to obtain a printed version of the image that appears substantially identical to the displayed version. The technique employs a display with sufficient resolution to present images as they would appear when printed. The technique provides first version data defining a first version of an image to the display so that the first version is displayed. The technique also uses the first version data to obtain second version data defining a second version of the image that a printer can print to provide an appearance substantially identical to the displayed first version. The technique provides the second version data to the printer so that the printer prints the second version, showing the image with an appearance substantially identical to the displayed first version.

The techniques described above can be implemented on a machine that includes memory and a processor, in addition to the display and data defining an image. The memory can store instructions the processor can execute to perform the techniques. The memory can also store transform data indicating a transform operation the processor can perform to obtain data defining a version of an image; for example, the transform data can indicate a transform operation for a type of devices. In addition, the memory can store default transform data indicating a default transform operation the processor can perform to obtain a default version of the starting image that is presented before the user provides a signal.

The display can be a monochrome or color active matrix liquid crystal display (AMLCD). The machine could, for example, be a copier or a printer, and the display could be a part of the copier or printer or it could be a display of a workstation or other computer connected to the copier or printer.

The techniques described above are advantageous compared to conventional techniques because they permit a user to overcome the problem of visualizing images and the problem of differences between displayed and printed images. Therefore, a user can iteratively view the image as it would appear when presented by several different types of devices or in several different ways. Upon finding a desired presentation, the user can cause the image to be presented.

The following description, the drawings, and the claims further set forth these and other aspects, objects, features, and advantages of the invention.

DETAILED DESCRIPTION

A. Conceptual Framework

Figure 1:
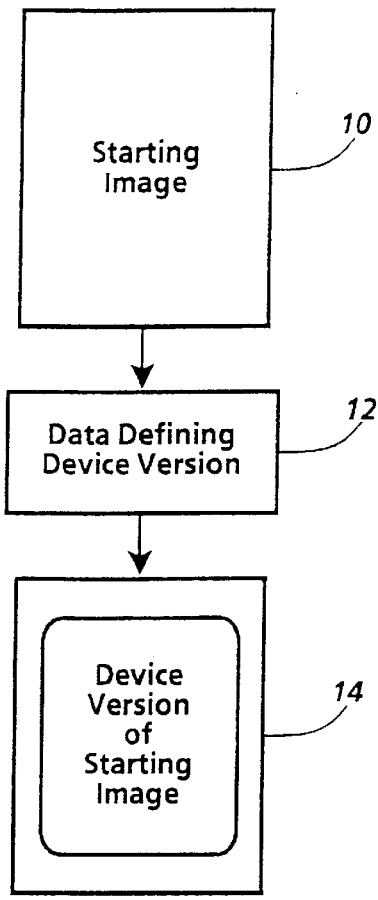
FIG. 1 is a schematic flow diagram showing how data defining a starting image can be used to display a version of the starting image as it would appear when presented by an image output device of another type.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time, where the second signal includes information from the first signal. Circuitry "stores" a first signal when it receives the first signal at one time and, in response, provides the second signal at another time. Circuitry "transfers" a first signal when it receives the first signal at a first location and, in response, provides the second signal at a second location.

A signal "indicates" or "selects" one of a set of alternatives if the signal causes the indicated one of the set of alternatives to occur.

A "data storage medium" or "storage medium" is a physical medium that can store data. Examples of data storage media include magnetic media such as floppy disks, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium.

A "storage medium access device" is a device that includes circuitry that can access data on a data storage medium. Examples include floppy disk drives and CD-ROM readers.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data processing system" or "system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other. For example, two components are "connected" by any combination of connections between them that permits transfer of signals from one of the components to the other. Two components are "electrically connected" when there is a combination of circuitry that can transfer electric signals from one to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "operates on" an item of data by performing an operation that includes obtaining a resulting item of data that depends on the item of data operated on. For example, the resulting item of data could result from an operation that accesses the item of data operated on or from a logic or arithmetic operation on the item of data operated on.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "indicates" a thing, an event, or a characteristic when the item has a value that depends on the existence or occurrence of the thing, event, or characteristic or on a measure of the thing, event, or characteristic.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

"User input circuitry" is circuitry for providing signals based on actions of a user. User input circuitry can receive signals from one or more "user input devices" that provide signals based on actions of a user, such as a keyboard or a mouse. A keyboard, for example, can provide "keystroke signals" based on keystrokes.

An "image" is a pattern of physical light.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature.

An item of data "defines" an image when the item of data includes sufficient information to produce the image. For example, a two-dimensional array can define all or any part of an image, with each item of data in the array providing a value indicating the color of a respective location of the image.

A "version" of a first image is a second image produced using an item of data defining the first image and that includes information from the first image. The second image may be identical to the first image, or it may be modified by changing the data defining the first image, or by other processes that result in a modified version.

"Image input circuitry" is circuitry for obtaining data defining images as input.

An "image input device" is a device that can receive an image and provide an item of data defining a version of the image.

"Scanning circuitry" is circuitry that can receive an image by a scanning operation, such as by scanning a document, and provide data defining a version of the image. A "scanner" is an image input device that receives an image by a scanning operation, such as by scanning a document.

"Image output circuitry" is circuitry for providing data defining images as output.

An "image output device" is a device that can provide output defining an image.

An image output device "presents an image" by providing output defining the image so that a viewer can perceive the image.

"Printing circuitry" is circuitry that can receive data defining an image and produce a version of the image on a marking medium. A "printer" is an image output device that includes printing circuitry.

"Display circuitry" is circuitry that can receive data defining a sequence of images and present versions of the images in sequence so that a viewer can perceive the versions of the images in sequence. A "display" is an image output device that includes display circuitry. Display circuitry or a display may, for example, include a cathode ray tube; an array of light emitting, reflecting, or absorbing elements; a structure that presents sequences of images on a screen, paper, or another medium; or any other structure capable of presenting sequences of images in response to data that define them. The term "display feature" refers to any human perception produced by display circuitry or a display when presenting an image.

A "selectable unit" is a display feature that is perceived as a bounded display area that can be selected. The term "select," when used in relation to a selectable unit, means an action by a user that causes user input circuitry to provide a signal uniquely indicating the selectable unit. In general, an action by a user "indicates" a thing, an event, or a characteristic when the action demonstrates or points out the thing, event, or characteristic in a manner that is distinguishable from actions that do not indicate the thing, event, or characteristic. The user can, for example, use a pointing device such as a mouse to select a selectable unit by indicating its position and clicking a button on the pointing device. In general, a selectable unit may take any appearance, and is not limited to a visually distinguishable feature or set of features that appears to be a coherent unity.

A selectable unit "represents" one of a set of alternatives if a user can obtain that alternative by selecting the selectable unit. A "menu" is a group of two or more selectable units, typically each a rectangle, that are perceptible as connected, where each selectable unit includes text, graphics, or other information indicating the alternative it represents. A "button" is a selectable unit that includes text, graphics, or other information indicating the alternative it represents and that is not perceptible as connected to other selectable units.

An "active matrix liquid crystal display" or "AMLCD" is a liquid crystal display that includes a liquid crystal cell and an array of control units that can cause presentation of an image by the liquid crystal cell. Each control unit causes presentation of a segment by controlling a light transmission characteristic of an adjacent part of the liquid crystal cell.

In general, the term "resolution," when used in relation to display circuitry or a display, means a measure of the precision with which features such as lines can be distinguished in images presented by the display circuitry or display. Typically, measures of resolution increase as distinguishable feature size or separation becomes smaller, so that "high resolution" means small features or small separations between features are visible, while "low resolution." means small features and small separations between features are not visible. Resolution is often measured as the width of the smallest segment of an image that can be controlled.

Display circuitry or a display has "sufficient resolution" to present images as they would appear on a type of image output devices if substantially all features and separations between features that are perceptible to most humans with normal vision when images are presented at usual viewing distances by the type of image output devices are also perceptible to most humans with normal vision when the images are presented at usual viewing distances by the display circuitry or display.

A version of an image can be presented on display circuitry or a display to show an image "as it would appear when presented by" a type of image output device if substantially all features that would be perceptible in the image to most humans with normal vision when presented at usual viewing distances by the type of image output device are perceptible to most humans with normal vision when the version is presented at usual viewing distances on the display circuitry or display. Similarly, display circuitry or a display presents a version of an image showing an image "as it would appear when presented by" a type of image output device if substantially all features that would be perceptible in the image to most humans with normal vision when presented at usual viewing distances by the type of image output device are perceptible to most humans with normal vision when the display circuitry or display presents the version at usual viewing distances.

A display presents a version of an image showing an image "as it would appear when presented by" a type of image output device if substantially all features that would be perceptible in the image to most humans with normal vision when presented at usual viewing distances by the type of image output device are perceptible to most humans with normal vision when the display presents the version at usual viewing distances.

A "transform operation" is an operation that can be performed on data defining an image to obtain data defining a version of the image that can be presented by an image output device to show the image.

An image is "perceptible as substantially identical to" another image if most humans with normal vision viewing the two images in sequence at usual viewing distances would conclude that the two were the same image.

A "type of image output devices" is a set of similarly structured image output devices, each of which responds to data defining an image by performing substantially the same operations so that the image is presented in substantially the same way. An image presented by a properly functioning image output device of a type should be perceptible as substantially identical to the same image presented by other properly functioning image output devices of the same type, subject to uncontrolled variations between devices such as wear and tear, temperature, humidity, toner composition, and so forth.

B. General Features

Figure 2:
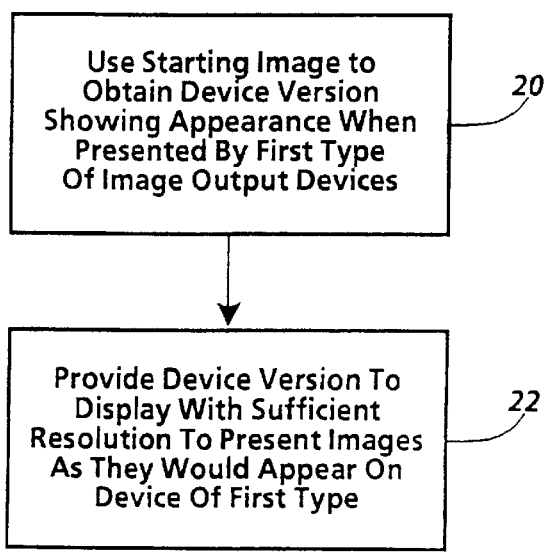
FIG. 2 is a flow chart showing general acts in using data defining a starting image to display a version of the starting image as it would appear when presented by an image output device of another type.
Figure 3:
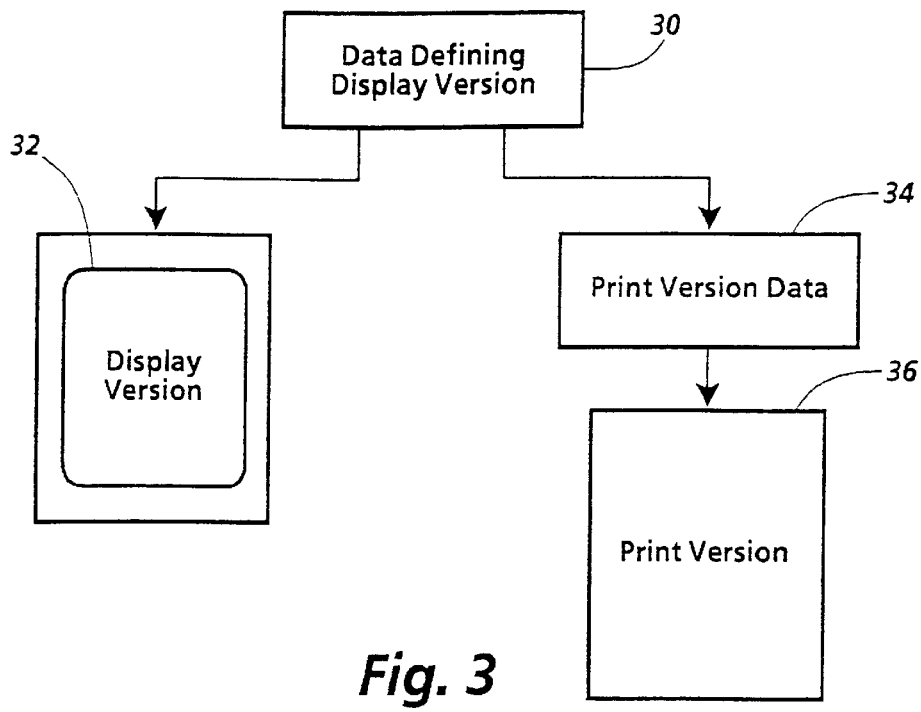
FIG. 3 is a schematic flow diagram showing how data defining a displayed image can be used to obtain a printed image that appears substantially identical to the displayed image.
Figure 4:
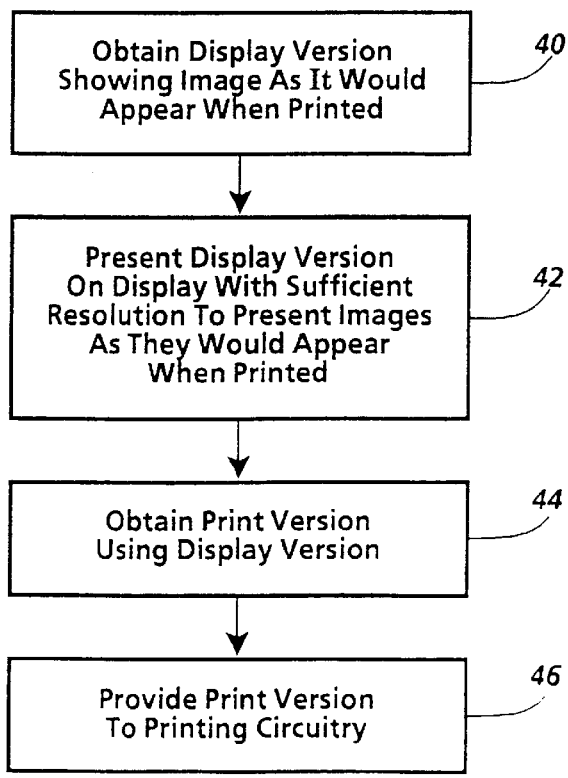
FIG. 4 is a flow chart showing general acts in using data defining a displayed image to obtain a printed image that appears substantially identical to the displayed image.

FIGS. 1–4 show general features of the invention. FIG. 1 shows how data defining at starting image can be used to display a version of the image as it would appear when presented by an image output device of another type. FIG. 2 shows general acts in using data defining a starting image to display a version of the image as it would appear when presented by an image output device of another type. FIG. 3 shows how display version data used to display a version of an image can be used to obtain a printed version of the image substantially identical to the displayed version. FIG. 4 shows general acts in using display version data to obtain a printed version of an image substantially identical to the displayed version.

The technique of FIG. 1 begins with data defining starting image 10, which could be obtained, for example, from image input circuitry. The data defining starting image 10 is then used to automatically obtain device version data 12. Device version data 12 define a version of starting image 10 that can be presented on a display to show starting image 10 as it would appear when presented by a first type of image output devices. This is possible if the display has sufficient resolution to present output images as they would appear on a first type of image output devices.

Device version data 12 can then be provided to a display with sufficient resolution, resulting in presentation of device version 14 of starting image 10. Device version 14 shows starting image 10 as it would appear when presented by an image output device of the first type.

In FIG. 2, the act in box 20 begins by using data defining a starting image to obtain device version data. The device version data define a device version of the starting image that can be presented on a display to show the starting image as it would appear when presented by a first type of image output devices.

The act in box 22 then provides the device version data to a display that has sufficient resolution to present output images as they would appear on a first type of image output devices. The display presents the device version, showing the starting image as it would appear when presented by an image output device of the first type.

The technique of FIG. 3 begins with display version data 30 defining a display version of an image that can be presented on display circuitry to show the image as it would appear when printed by printing circuitry. Display version data 30 is provided to display circuitry with sufficient resolution to present output images as they would appear when printed by the printing circuitry. As a result, the display circuitry presents display version 32. Display version data 30 is also used to obtain print version data 34, defining a print version of the image that can be printed by the printing circuitry. Print version data 34 is then provided to the printing circuitry, producing print version 36, which is perceptible as substantially identical to display version 32.

In FIG. 4, the act in box 40 begins by obtaining version data defining a display version of an image that can be presented on display circuitry to show the image as it would appear when printed by printing circuitry. The act in box 42 then provides the display version data to display circuitry with sufficient resolution to present output images as they would appear when printed by the printing circuitry, resulting in presentation of the display version.

The act in box 44 uses the display version data to obtain print version data defining a print version of the image that can be printed by the printing circuitry. The act in box 46 provides the print version data to the printing circuitry, which prints the print version, perceptible as substantially identical to the display version.

C. Implementation

The general features described above could be implemented in numerous ways on various machines.

C.1. Device Types

The general features described above in relation to FIGS. 1 and 2 can be implemented with a user interface permitting a user to indicate a type of image output devices. In response, an image is displayed as it would appear when presented by the indicated type. In addition, this implementation can perform transform operations that are obtained using a training interface. The implementation can be used for previewing.

C.1.a. User Interface

Figure 5:
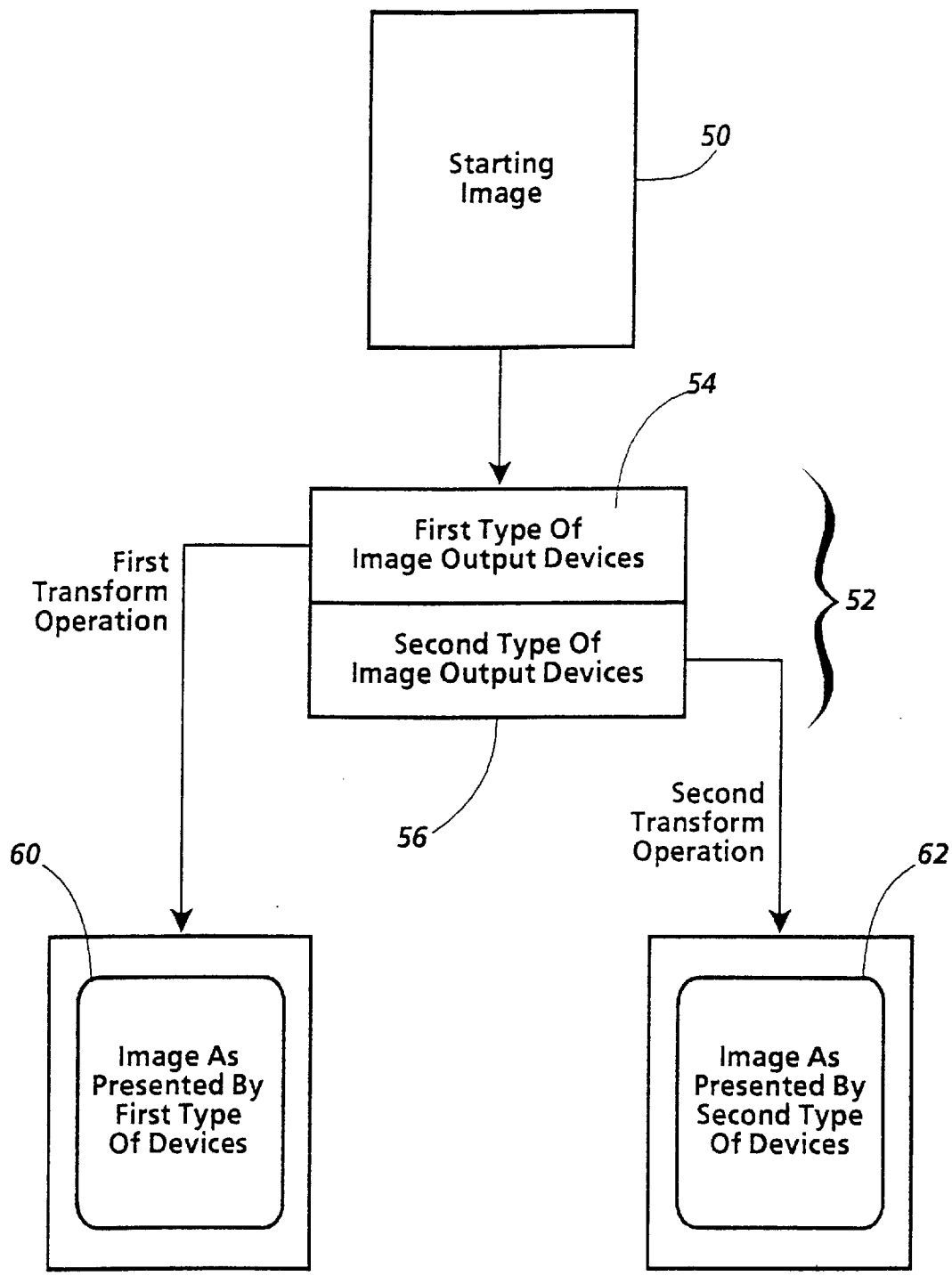
FIG. 5 is a schematic flow diagram showing how a user can select a menu item to indicate one of a set of types of image output devices, in response to which an image is presented as it would be presented by the indicated type of devices.
Figure 6:
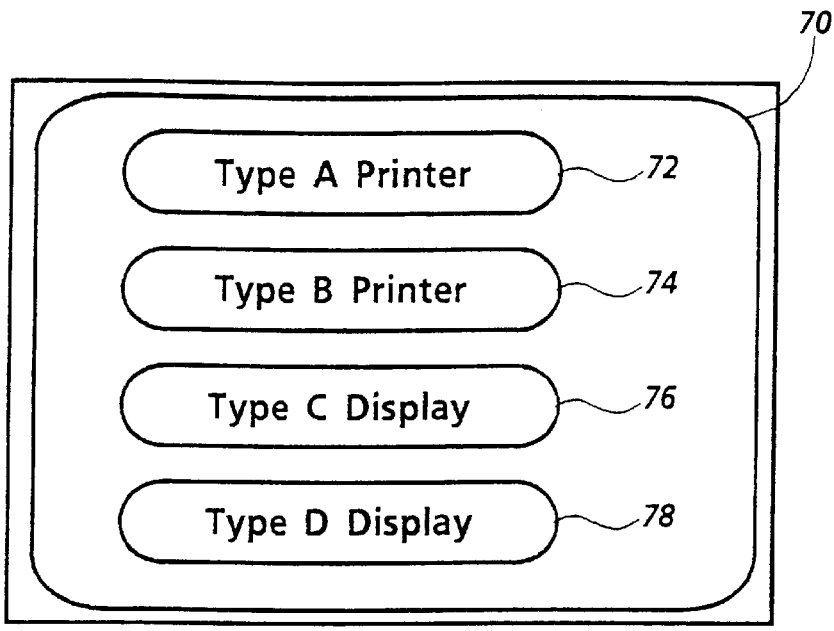
FIG. 6 shows a number of buttons a user could select to indicate one of a set of types of image output devices.
Figure 7:
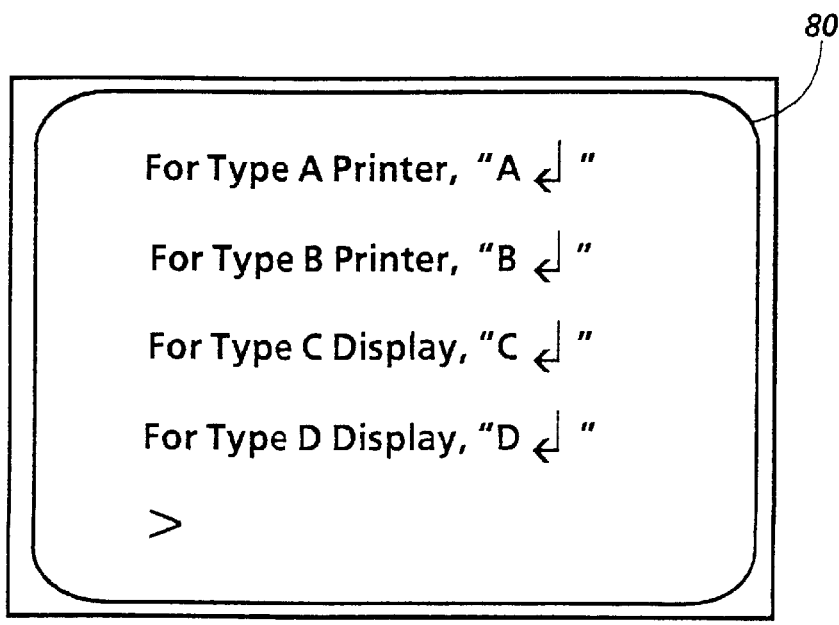
FIG. 7 shows an image that can be presented on a display to prompt a user to provide a sequence of keystrokes indicating one of a set of types of image output devices.
Figure 8:
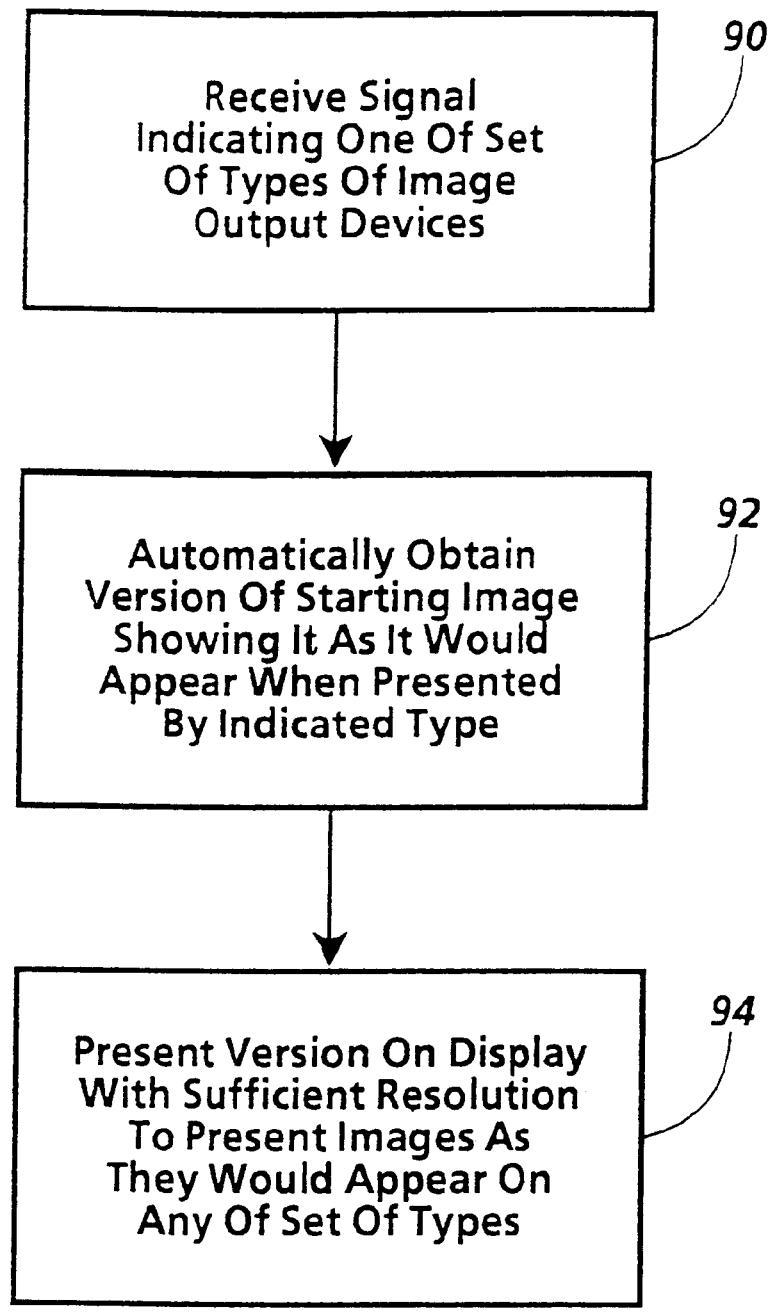
FIG. 8 is a flow chart showing general acts in responding to a signal indicating a type of image output devices by using data defining a starting image to automatically obtain a version of the starting image as it would be presented by the indicated type of devices.

FIGS. 5–8 illustrate user interface features of an implementation in which a user can indicate a type of image output devices to obtain a display showing an image as it would appear when presented by the indicated type. FIG. 5 shows how an image can be transformed and displayed as it would be presented by either of two types of image output devices in response to a selection of a menu item. FIG. 6 shows a set of buttons a user could select to indicate types of image output devices. FIG. 7 shows an image with sequences of keystrokes a user could perform to indicate types of image output devices. FIG. 8 shows general acts in responding to a signal indicating a type of image output devices by presenting a version showing a starting image as it would appear when presented by the indicated type.

The technique of FIG. 5 begins with data defining starting image 50, which could be obtained, for example, from image input circuitry.

FIG. 5 shows menu 52, which can be presented on a display. A user can select one of the items in menu 52 by providing signals through user input circuitry such as a mouse or other pointing device. Menu 52 illustratively includes selectable item 54 representing a first type of image output device and selectable item 56 representing a second type of image output device.

If the user selects item 54, the user input circuitry provides a signal indicating the first type of image output device. In response, a first transform operation can be performed, using the data defining the starting image to automatically obtain data defining first device version 60 of the starting image. Similarly, if the user selects item 56, the signal indicates the second type, and a second transform operation can be performed to automatically obtain data defining second device version 62 of the starting image.

As shown in FIG. 5, first device version 60 and second device version 62 can be presented on a display that has sufficient resolution to present images as they would appear on either of the first and second types of image output devices. When first device version 60 is presented, the display shows the starting image as it would appear when presented by the first type of image output devices. When second device version is presented 62, the display shows it as it would appear when presented by the second type.

FIG. 6 shows image 70, which includes selectable items 72, 74, 76, and 78, also referred to as buttons. As in menu 52 in FIG. 5, a user can select one of the buttons in image 70 by providing signals through user input circuitry such as a mouse or other pointing device. Each button illustratively represents a type of image output devices, with buttons 72 and 74 representing prints and buttons 76 and 78 representing displays. In each case, if a user selects a button, the user input circuitry provides a signal indicating the button's type of image output devices, and data defining a starting image can be used to automatically obtain data defining a version of the starting image for the button's type. The version can be presented on the display, showing the starting image as it would appear when presented by the buttons type of image output devices.

FIG. 7 similarly shows image 80, in which are listed a number of types of image output devices, together with a sequence of keystrokes that a user can perform to obtain a version of a starting image for each type. Each keystroke sequence illustratively includes a character followed by a carriage return, but each sequence could include only one keystroke or some other combination of keystrokes. The types in FIG. 7 are the same as the types in FIG. 6, illustrating that a wide variety of user actions can be performed to indicate one of a set of types of image output devices.

In FIG. 8, the act in box 90 begins by receiving a signal from user input circuitry indicating one of a set of two or more types of image output devices. In response, the act in box 92 uses data defining a starting image to automatically obtain data defining a version that, when presented on a display of sufficient resolution, shows the starting image as it would appear when presented by the type indicated by the signal received in box 90. The act in box 94 provides the data defining the version from box 92 to a display that presents the version; the display is a display with sufficient resolution to present images as they would appear on any of the set of types of image output devices, so that the display shows the starting image as it would appear when presented by the indicated type.

The acts in FIG. 8 implement the more general acts described above in relation to FIGS. 1 and 2.

C.1.b. Transforms

Figure 9:
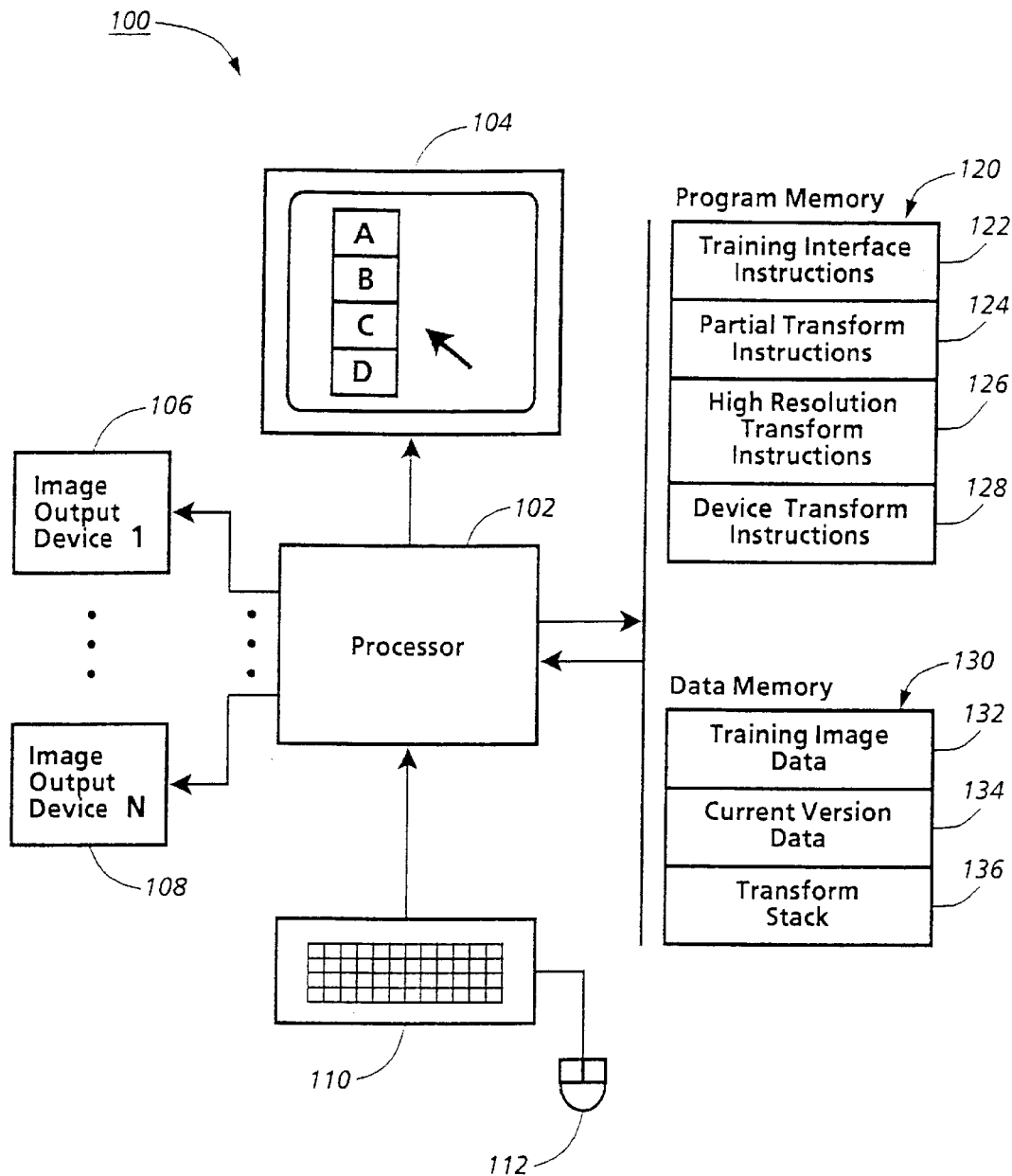
FIG. 9 is a schematic block diagram showing components of a system that can be used to produce transform data indicating a sequence of image processing operations.
Figure 10:
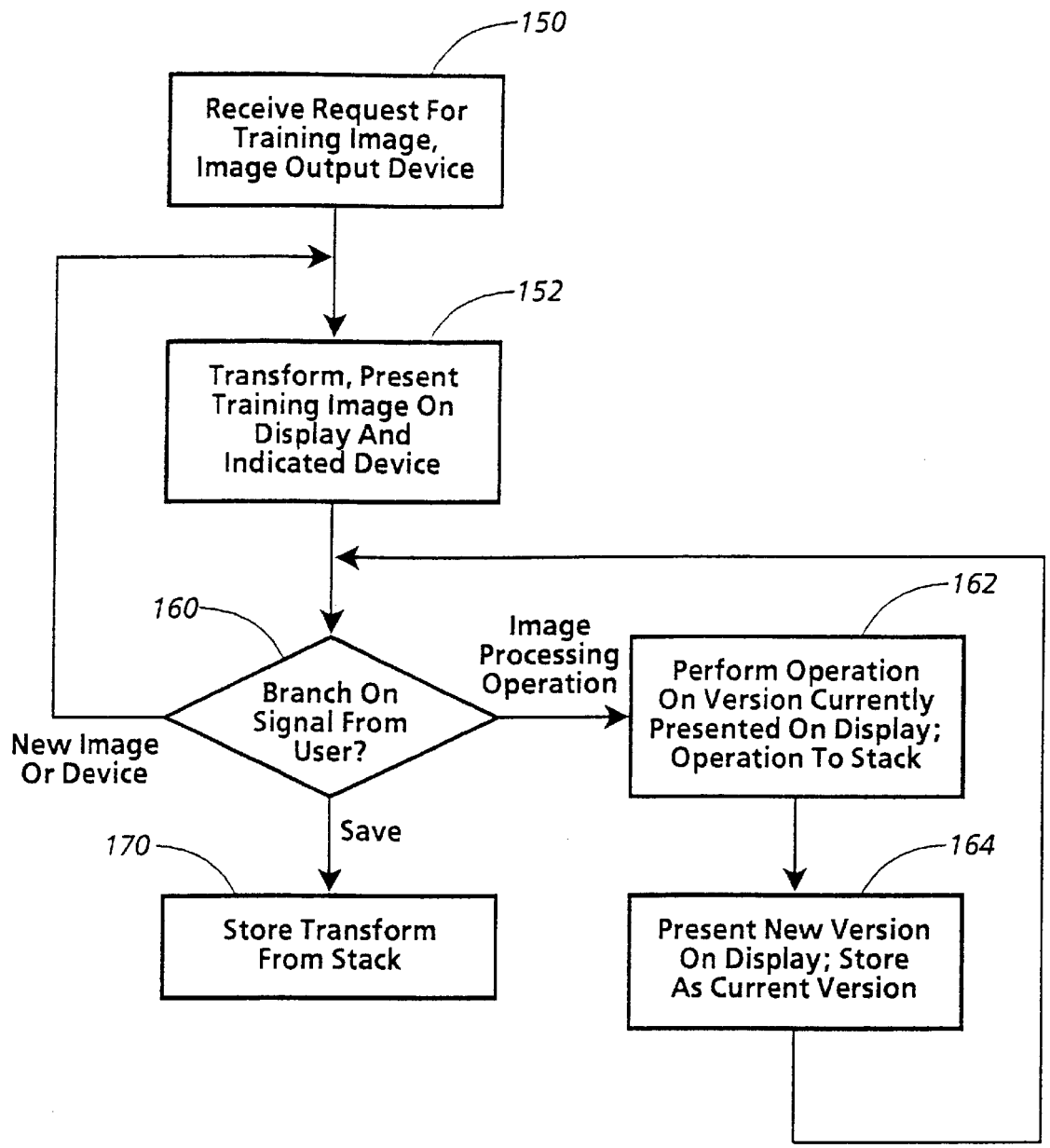
FIG. 10 is a flow chart showing acts in operating the system of FIG. 9 to produce transform data.

FIG. 9 shows a system that could be used to obtain transform data defining a transform operation that obtains data defining a version of an image showing it as it would appear when presented by a type of image output devices. FIG. 10 shows acts in operating the system of FIG. 9 to obtain transform data.

System 100 in FIG. 9 includes processor 102, which can be the central processing unit (CPU) of a workstation, personal computer, or other data processing system. Processor 102 is connected to provide data defining output images to display 104 and to each of a set of N image output devices 106 through 108, each of which is an example of a different type of image output devices than the others. Display 104 has sufficient resolution to present images as they would appear on any of image output devices 106 through 108. Display 104 can be implemented as described in copending, coassigned U.S. patent application Ser. No. 08/235,011, now issued as U.S. Pat. No. 5,491,347, entitled "Thin-Film Structure With Dense Array of Binary Control Units for Presenting Images," incorporated herein by reference.

Processor 102 is also connected to receive signals from user input circuitry that illustratively includes keyboard 110 and mouse 112. Processor 102 is also connected to access data stored in memory that illustratively includes program memory 120 and data memory 130. Processor 102 can execute instructions stored in program memory 120. During execution of instructions, processor 102 can access data stored in data memory 130.

In executing training interface instructions 122, processor 102 provides a user interface through which a user can iteratively create a transform with a sequence of basic image processing operations that, together, produce a desired version of a starting image. Partial transform instructions 124, which can be called by training interface instructions 122, include instructions processor 102 can execute to perform any of a set of basic image processing operations, such as dilation, convolution, subsampling, point operations, erosion, and so forth. Training interface instructions 122 and partial transform instructions 124 can be obtained as a conventional software product such as IPLab from Signal Analytics Corporation, Vienna, Va.; HIPS from SharpImage Software, New York, N.Y.; or MATLAB from The Math Works, Inc., South Natick, Mass. Training interface instructions 122 can also call high resolution transform instructions 126 to obtain a version of an image for presentation by display 102 and device transform instructions 128 to obtain a version of an image for presentation by one of the set of image output devices 106 through 108. High resolution transform instructions 126 can be implemented as described in copending, coassigned U.S. patent application Ser. No. 08/235,015, continued as Ser. No. 08/679,168, now issued as U.S. Pat. No. 5,703,621, entitled "Universal Display That Presents All Image Types With High Image Fidelity," incorporated herein by reference.

During execution of training interface instructions 122, the user can request presentation of any of a set of training images defined by training image data 132. To assist a user in obtaining robust transforms that provide satisfactory versions of diverse images, training image data 132 can define a diverse set of training images.

The user can also indicate one of the set of image output devices 106 through 108 for which the user intends to produce a transform, such as by using mouse 112 to position a pointer over the menu item and to provide a button click selecting the menu item. In response, processor 102 presents requested training image on display 104 and on an image output device of the indicated type, executing high resolution transform instructions 126 and device transform instructions 128 as appropriate. This allows the user to compare the version presented by display 104 with the version presented by the device of the indicated type.

Then, the user can request a basic image processing operation on the image presented by display 104, in response to which processor 102 obtains current version data 134 defining a version of the presented image that results from the requested image processing operation. Processor 102 then presents the version defined by current version data 134 on display 104, again executing high resolution transform instructions 126, and adds the basic image processing operation to transform stack 136. Iterations like this can continue until transform stack 136 contains a sequence of basic image processing operations that, together, provide a transform that produces a version of the image on display 104 that is perceptible as substantially identical to the image presented by the indicated image output device.

FIG. 10 illustrates one way training interface instructions 122 could be implemented. The act in box 150 begins by receiving signals from the user input circuitry requesting presentation of one of the images defined by training image data 132 and indicating one of the types of image output devices exemplified by devices 106 through 108.

In the act in box 152, processor 102 responds to the signals from box 150 by executing high resolution transform instructions 126 and device transform instructions 128, using data defining the requested training image to obtain data defining versions for presentation on display 104 and on the image output device of the indicated type. Processor 102 then provides the data defining the versions to display 104 and the image output device. Processor 102 also stores the data defining the version for display 104 as current version data 134.

The act in box 160 branches based on signals from user input circuitry. If the signals indicate one of the basic image processing operations, the act in box 162 performs the indicated operation on the version of the training image currently presented on display 104. Processor 102 can access current version data 134 to obtain data on which to perform the operation. Processor 102 also pushes the operation onto transform stack 136.

The act in box 164 presents the new version obtained in box 162 on display 104 and stores it as current version data 134.

The acts in boxes 162 and 164 can be performed for several iterations, each of which begins with signals from the user input circuitry indicating a basic image processing operation. Finally, when the version presented on display 104 is perceptible as substantially identical to the version presented on the device of the indicated type, the user can provide signals requesting that the operations in transform stack 136 be stored in memory for future use. In this case, the act in box 170 stores transform data indicating the sequence of basic image processing operations that produced the version presented on display 104.

If the user provides signals requesting a new training image or a new type of image output devices, the act in box 152 can be performed for the indicated training image or type of device. Then the user can again request image processing operations.

C.1.c. Previewing

Figure 11:
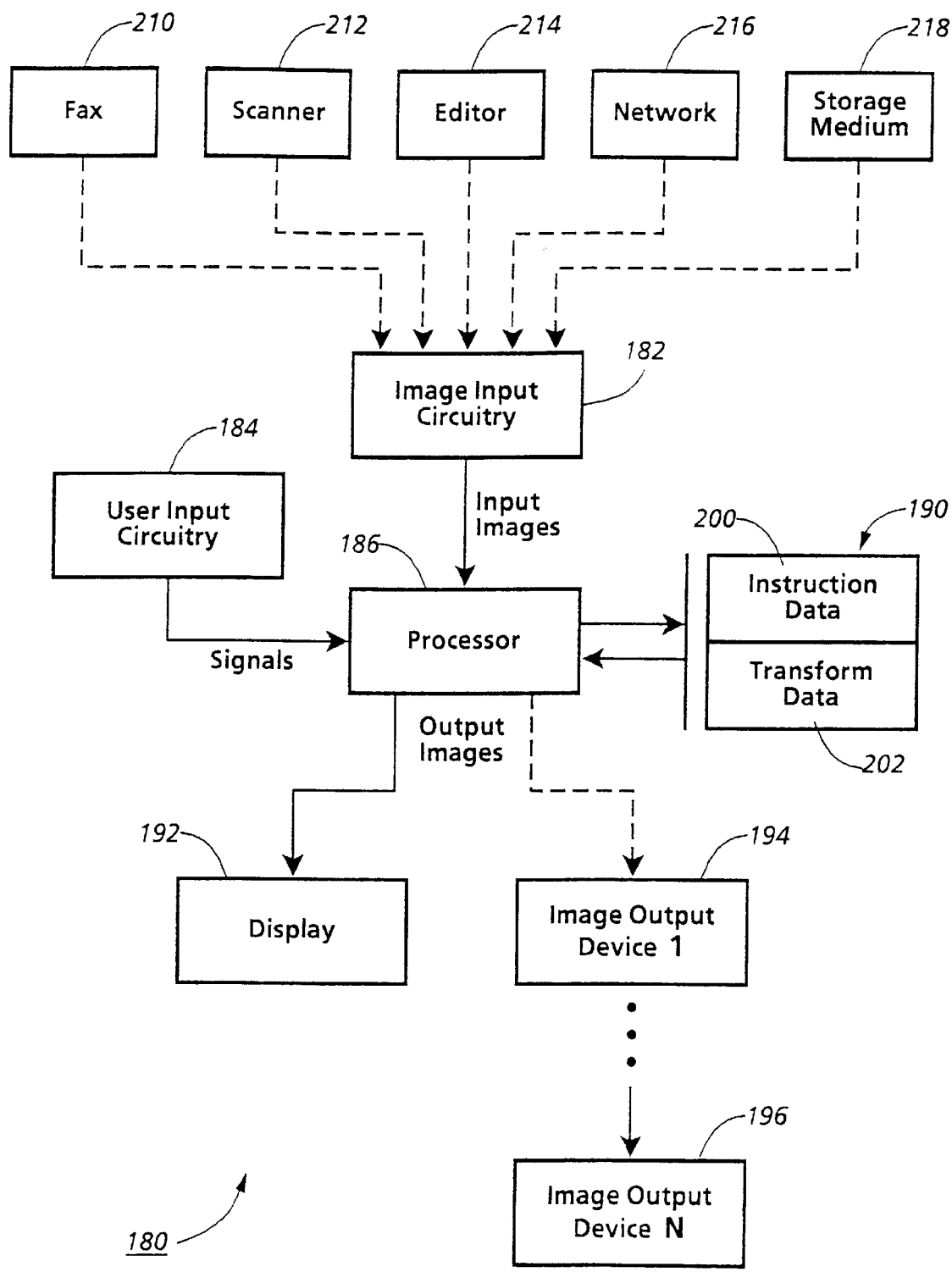
FIG. 11 is a schematic block diagram showing general components of a machine that can display versions of images using the technique in FIG. 8.
Figure 12:
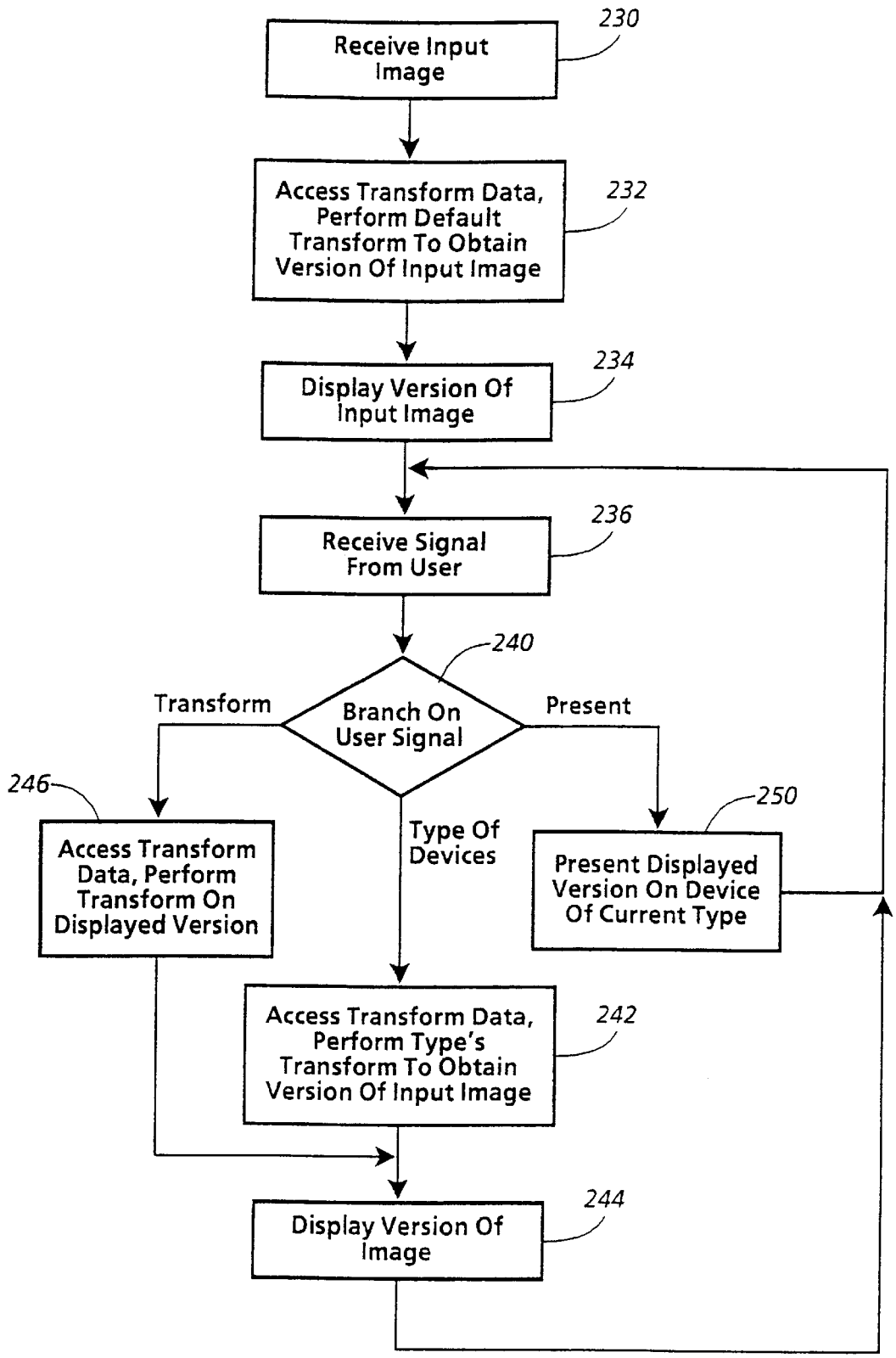
FIG. 12 is a flow chart showing general acts in operating the machine of FIG. 11.

FIG. 11 shows a machine that can implement the features in FIGS. 5–8. FIG. 12 shows how the machine of FIG. 11 can implement the acts of FIG. 8.

In FIG. 11, machine 180 includes input image circuitry 182, user input circuitry 184, processor 186, memory 190, and display 192. Processor 186 is connected for receiving data defining input images from image input circuitry 182, for receiving signals from a user from user input circuitry 184, for providing data defining output images to display 182, and for accessing data in memory 190.

Processor 186 can also be connected, as indicated by dashed line, for providing data defining output images to N image output devices 194 through 196. Display 192 has sufficient resolution to present images as they would appear on any of image output devices 194 through 196. Display 192 can be implemented as described in copending, coassigned U.S. patent application Ser. No. 08/235,011, now issued as U.S. Pat. No. 5,491,347, entitled "Thin-Film Structure With Dense Array of Binary Control Units for Presenting Images," incorporated herein by reference.

The data in memory 190 includes instruction data 200 and transform data 202. Instruction data 200 indicate instructions that processor 186 can execute to perform the acts in FIG. 8. Transform data 202 indicate transform operations that processor 186 can perform to implement the act in box 92 in FIG. 8 for each of a set of types of image output devices.

FIG. 11 also shows, by dashed lines, that image input circuitry 182 could receive data defining images from a number of sources, including facsimile (fax) machine 210; scanner 212; editor 214, which could be an interactive image editor controlled by user input devices such as a keyboard and mouse or a pen- or stylus-based input device; from network 216, which could be a local area network or other network capable of transmitting data defining an image; or from storage medium 218, which could be any storage medium capable of storing data defining images, and could be accessible through an appropriate storage medium access device connected to image input circuitry 182.

In general, components of machine 180 in FIG. 11 could be implemented in the same way as equivalent components in system 100 in FIG. 9. For example, processor 186 could be the CPU of a workstation, personal computer, or other data processing system; user input circuitry 184 could include a keyboard and a mouse.

FIG. 12 shows acts performed by machine 180 in FIG. 11 in executing the instructions indicated by instruction data 200. Some of the acts in FIG. 12 implement general acts in FIG. 8. As shown, however, the technique in FIG. 12 is iterative, and can continue as long as a user provides input signals.

In the act in box 230, processor 186 receives a data item defining an input image from image input circuitry 182.

In the act, in box 232, processor 186 accesses transform data 202 to obtain data indicating a default transform, which can be a transform as described above in relation to high resolution transform instructions 126, and can be implemented as described in copending, coassigned U.S. patent application Ser. No. 08/235,015, continued as Ser. No. 08/679,168, now U.S. Pat. No. 5,703,621, entitled "Universal Display That Presents All Image Types With High Image Fidelity," incorporated herein by reference. Then processor 186 performs the default transform using the input image data item from box 230 to obtain another data item defining an output image that is a high resolution version of the input image but in a form appropriate for presentation by display 192.

In the act in box 234, processor 186 provides the output image data item from box 232 to display 192. Display 192 responds by presenting the output image.

In the act in box 236, processor 186 can then receive a signal from user input circuitry 184. The signal can, for example, indicate a type of image output devices as in box 90 in FIG. 8, a transform, or a request to present an image currently presented on display 192 on one of image output devices 194 through 196 that is of an indicated type. In the act in box 240, processor 186 can then branch based on the signal received in box 236.

If the signal from box 236 indicates a type of devices as in box 90, the act 242 is performed, in which processor 186 accesses transform data 202 to obtain data indicating a transform operation for the indicated type; processor 186 performs the transform using the input image data item from box 230 to obtain another data item defining another output image that is a version of the input image, as in box 232. The version obtained in box 242, when presented by display 192, shows the input image as it would appear when presented by the indicated type of devices, so that the act in box 242 implements the act in box 92 in FIG. 8.

In the act in box 244, processor 186 provides an output image data item from box 242 to display 192. Display 192 responds by presenting the output image. Because display 192 has sufficient resolution to present images as they would appear on any of the types of image output devices represented by devices 194 through 196, the act in box 194 implements the act in box 94 in FIG. 8.

In some cases, a user may wish to directly specify a transform to be performed on a displayed image. For example, the user may desire a spatial filtering transform, a contrast change transform, a thresholding transform, or any other image processing transform for which transform data 202 provides instructions that processor 186 can execute to perform the transform. If the signal from box 236 indicates a transform, the act in box 246 accesses transform data 202 and performs the indicated transform on data defining the currently displayed version of the input image to obtain data defining a version that is transformed as indicated.

If the signal from box 236 indicates a request to present the image currently displayed on the currently indicated type of image output devices, the act in box 250 is performed, in which processor 186 obtains data defining a version of the currently displayed image for presentation on the indicated type of image output device. Processor 186 then provides the data defining the version to whichever of image output devices 194 through 196 is of the indicated type, which presents it.

C.2. Parameters

Figure 13:
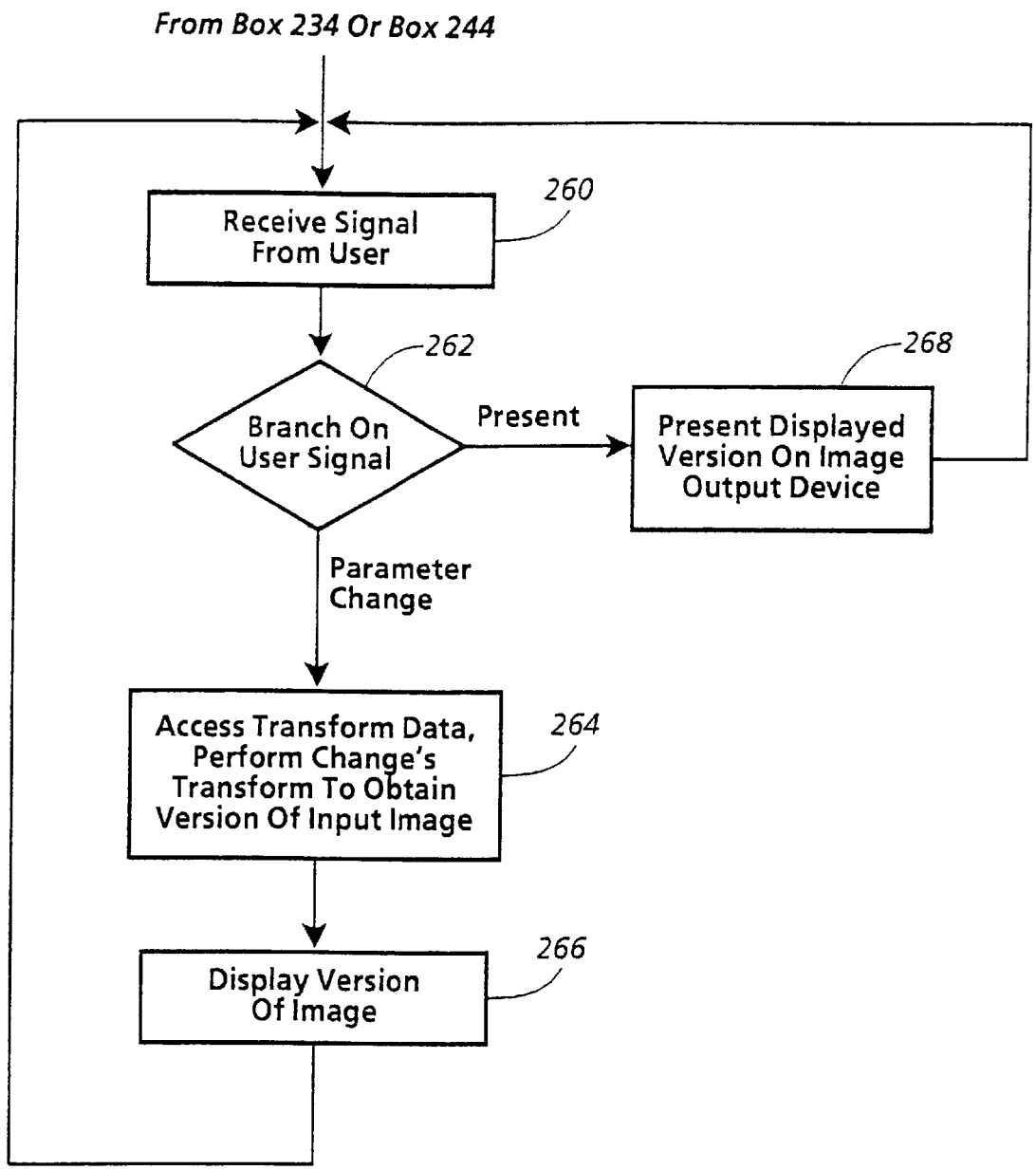
FIG. 13 is a flow chart showing how the acts in FIG. 12 could be modified to respond to signals indicating changes in parameters.

FIG. 13 illustrates another implementation of the features described above in relation to FIGS. 1 and 2. The technique of FIG. 13 is similar to the technique of FIGS. 5–12, but with modifications as described below.

The act in box 260 in FIG. 13 can follow box 234 or box 244 in FIG. 12, as shown. In the act in box 260, processor 186 can receive a signal from user input circuitry 184. The signal can, for example, indicate a change in a parameter for the current type of image output devices or a request to present an image currently presented on display 192. In the act in box 262, processor 186 can then branch based on the signal received in box 260.

If the signal from box 260 indicates a change in parameter, the act in box 264 accesses transform data 202 to obtain data indicating a transform operation for the indicated change of parameter; processor 186 performs the transform using the input image data item from box 230 to obtain another data item defining another output image that is a version of the input image, as in box 232. The version obtained in box 264, when presented by display 192, shows the input image as it would appear when presented by the current type of devices operating with the changed parameter.

Transform data for use in box 264 could be obtained similarly to the technique described above in relation to FIGS. 9 and 10, with the following modifications: The act in box 150 could receive a request that also indicates a parameter value.

If the parameter value indicated in box 150 is a value of a internal parameter used by the indicated type of devices in obtaining data defining a version of an image to be presented, the act in box 152 could perform the same operation the indicated type would perform so that the training image is presented by the indicated device with the indicated parameter value. In addition to parameters relating to image processing, internal parameters could include other operating parameters of an image output device, such as single or multiple pass printing or paper tray selection for a printer, and so forth. The act in box 152 could also perform a similar sequence of one or more basic image processing operations on the version presented on the display to provide a first approximation, storing the sequence on the transform stack as a starting point for the act in box 162.

If the parameter value indicated in box 150 is a value of an external parameter such as angle of observation, viewing distance, or projection distance, the user may move to an appropriate position or move the indicated device to an appropriate position to simulate the indicated parameter value. If the parameter value is an angle of observation, for example, basic image processing operations such as keystoning and change of contrast should obtain a displayed version showing the image as it would appear when viewed from the indicated angle of observation. If the parameter value is a viewing distance or a projection distance for an image output device that is a projector, basic image processing operations such as subsampling or pixel replication should obtain a displayed version showing the image as it would appear when viewed from the indicated viewing distance or when projected at the indicated projection distance. Other possible external parameters include color or other attribute of paper of other marking medium for a printer and ambient light level for a display.

When the version presented on display 104 is perceptible as substantially identical to the version presented on the device of the indicated type with the indicated parameter, the user can provide a save signal as in box 160. The act in box 170, rather than simply storing transform data so that it can be accessed by type of devices as in box 242 in FIG. 12, would also store it so that it can be accessed by parameter value in box 264 in FIG. 13.

In the act in box 266, processor 186 provides an output image data item from box 264 to display 192. Display 192 responds by presenting the output image as described in relation to box 244 above.

If the signal from box 260 indicates a request to present the image currently displayed, the act in box 268 is performed, similarly to box 250 in FIG. 12. Techniques for implementing the acts in boxes 250 and 268 are described below.

C.3. Image Presentation

Figure 14:
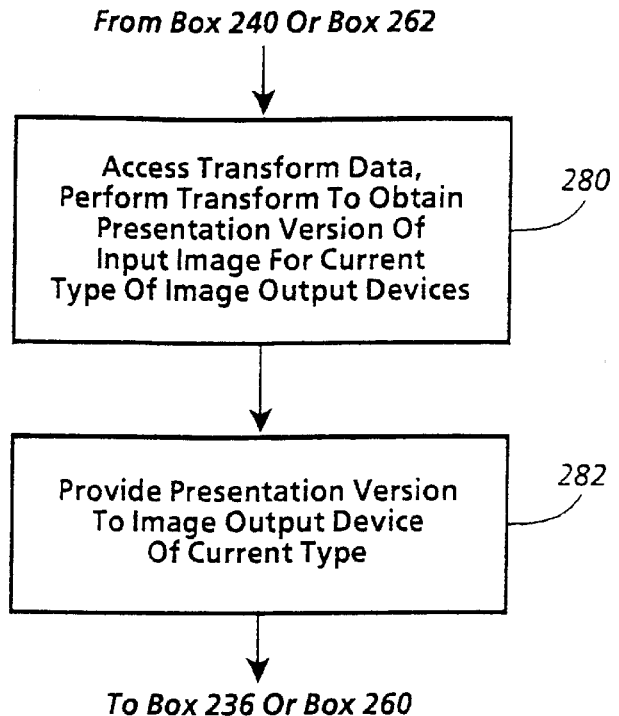
FIG. 14 is a flow chart showing how a displayed version could be presented in FIGS. 12 and 13.
Figure 15:
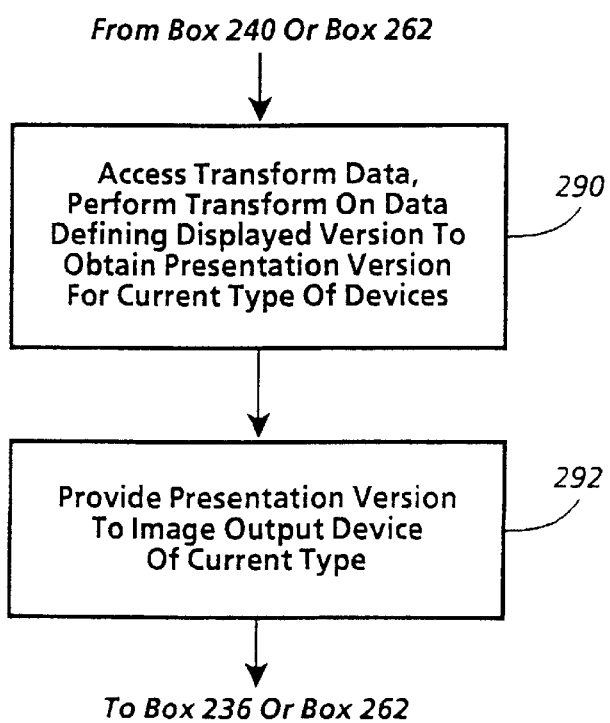
FIG. 15 is a flow chart showing another way a displayed version could be presented in FIGS. 12 and 13.

FIGS. 14 and 15 illustrate implementations of some of the features described above in relation to FIGS. 1 and 2. The techniques of FIGS. 14 and 15 can be used to implement the act in box 250 in FIG. 12 and the act in box 268 in FIG. 13.

In the act in box 280 in FIG. 14, processor 186 can access transform data 202 and perform any transforms necessary to obtain a presentation version of the input image from box 230 appropriate for presentation on the currently indicated type of image output devices with current parameter values for that type of devices. The act in box 280 may, for example, transform the input image into a form appropriate for a page description language (PDL) data structure. The PDL data structure may also include the current parameter values, or the parameter values may be provided in another appropriate form.

Then, the act in box 282 provides the presentation version of the input image to the device of the currently indicated type for presentation.

In the act in box 290 in FIG. 15, processor 186 can access transform data 202 and perform a transform that uses data defining the currently displayed image to obtain a presentation version for presentation on the currently indicated type of image output devices with the current parameter values. Similar to the act in box 280, the act in box 290 may transform the displayed image into a form appropriate for a PDL data structure. If the data defining the currently displayed image indicates pixel values, for example, the pixel values can be included in the PDL data structure in an appropriate form.

Then, the act in box 292 provides the presentation version of the input image to the device of the currently indicated type for presentation, as in box 282.

As described below, a variation on the technique in FIG. 15 can be especially useful in print previewing.

C.4. Print Previewing

Figure 16:
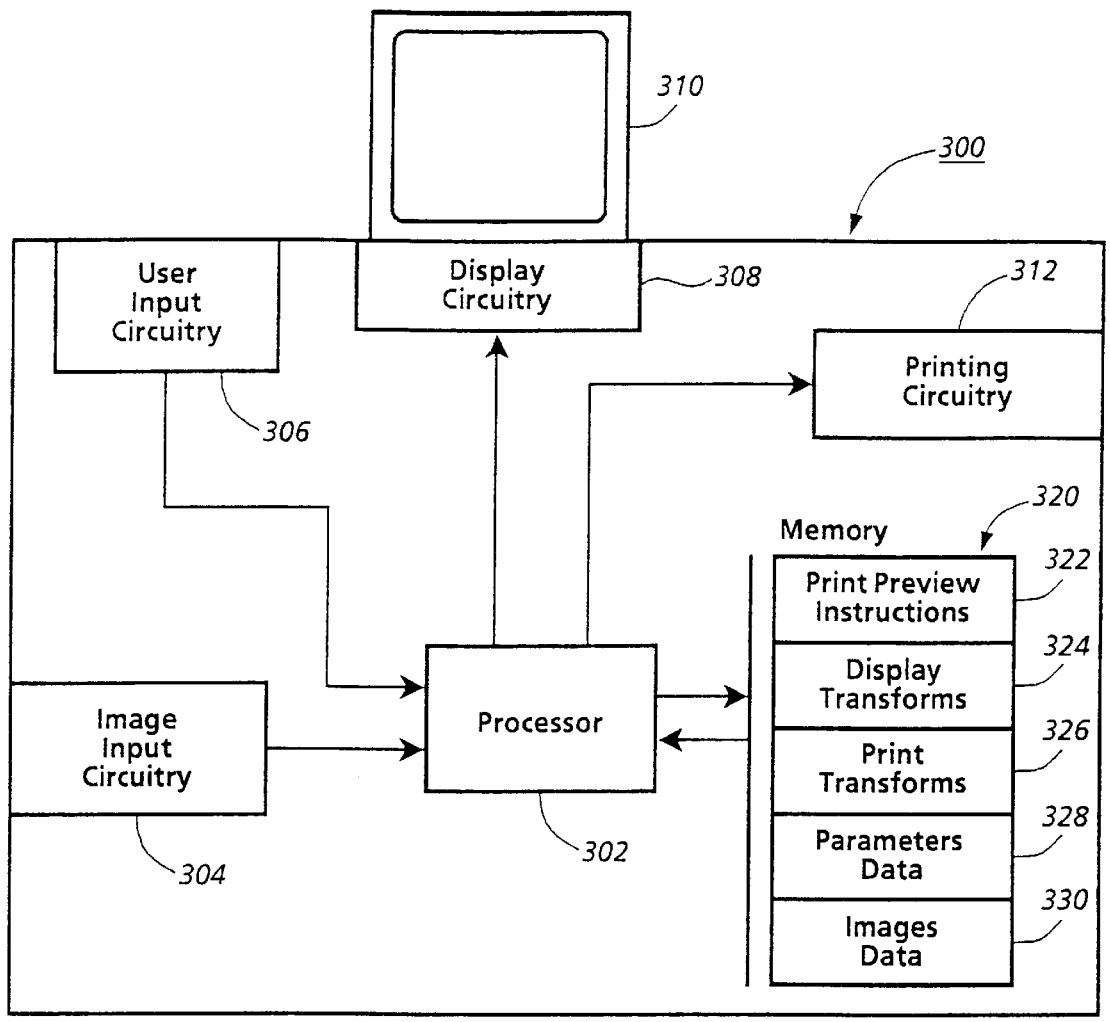
FIG. 16 is a schematic block diagram showing components of a machine implementing a print preview technique.
Figure 17:
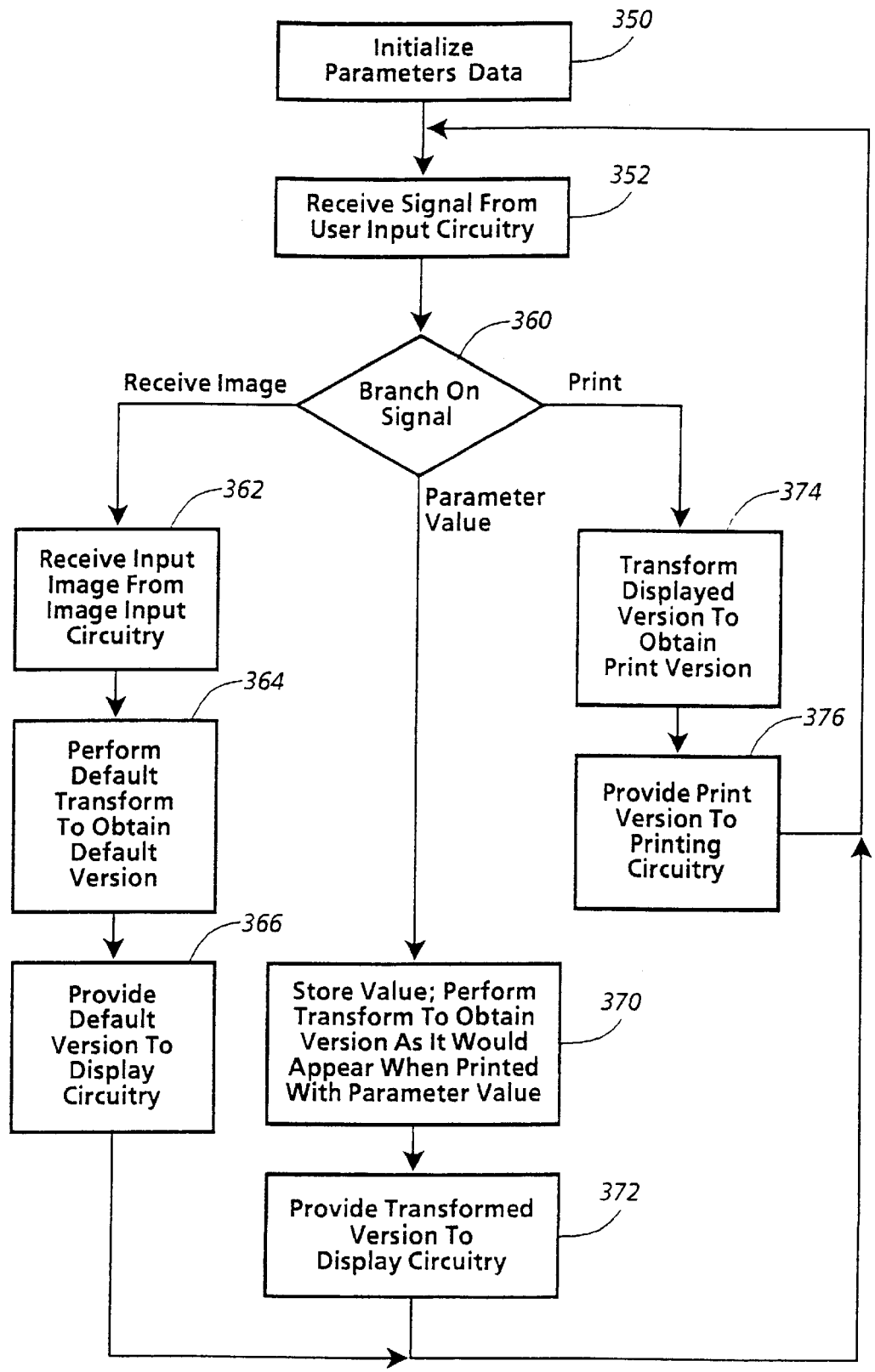
FIG. 17 is a flow chart showing acts performed by the machine of FIG. 16 in performing print previewing.

FIGS. 16 and 17 illustrate a print previewing implementation of the features described above in relation to FIGS. 3 and 4 that extends the technique described above in relation to FIG. 15. FIG. 16 shows a machine in which print previewing can be implemented. FIG. 17 shows operations performed by the machine of FIG. 16 in performing print previewing.

In machine 300 in FIG. 16, processor 302 is connected for receiving data defining input images from input image circuitry 304. Processor 302 is also connected for receiving signals from a user through user input circuitry 306. Processor 302 is connected for providing data defining output images to display circuitry 308, which presents images on display 310, and to printing circuitry 312, which prints images on marking media such as paper. Display 310 has sufficient resolution to present output images as they would appear when printed by printing circuitry 312.

Processor 302 is connected for accessing memory 320, which can include program and data memories. Print preview instructions 322 can be stored in program memory, and processor 302 can execute instructions 322 in performing the acts described below in relation to FIG. 17. Display transforms 324 could be stored either in program memory or in data memory, depending on how transform operations are implemented, and could in either case be accessed by processor 302 when preparing data defining an output image for presentation on display 310. Similarly, print transforms 326 could be stored either in program memory or in data memory and could in either case be accessed by processor 302 when preparing data defining an output image for printing by printing circuitry 312. Parameters data 328 can be stored in data memory, and indicate current parameters for printing circuitry 312. Images data 330 define images.

The act in box 350 in FIG. 17 begins by initializing parameter data 328 to indicate default values of the parameters for printing circuitry 312. The act in box 352 then receives a signal from user input circuitry 306. In response, the act in box 360 branches on the signal.

If the signal from box 352 indicates that an image should be received, the act in box 362 receives data defining an input image from image input circuitry 304. The data defining the input image can be stored in images data 330.

Then, the act in box 364 accesses display transforms 324 to obtain a default transform, which is performed on the input image to obtain data defining a default version, similarly to box 232 in FIG. 12. The data defining the default version can be stored in images data 330. The act in box 366 provides the default version to display circuitry 308, which presents the default version on display 310.

If the signal from box 352 indicates a parameter value, the act in box 370 stores the indicated value in parameters data 328. The act in box 370 also uses the value to access display transform 324 to obtain a transform for the value, which is performed on data from images data 330 that define the currently displayed image. The transform obtains data defining a transformed version of the currently displayed image as it would appear when printed by printing circuitry 312 with the indicated parameter value. The data defining the transformed version could also be stored in images data 330.

The act in box 372 provides the data defining the transformed version to display circuitry 308, which presents the transformed version on display 310.

If the signal from box 352 indicates a request to print the currently displayed image, the act in box 374 accesses print transform 326 and performs the print transform on data defining the currently displayed image to obtain data defining a print version. The act in box 376 then provides the print version to printing circuitry 376, which prints an image that appears substantially identical to the displayed image.

C.5. Variations

The implementations described above can use a high resolution AMLCD, as noted. The invention could also be implemented, however, with other types of high resolution displays.

The implementations described above receive user signals indicating a type of image output devices, changes in parameters, and requests to present an image. The invention could be implemented to receive user signals of other types, including signals requesting editing operations on a presented image.

The implementation described above receives user signals that are provided by selecting menu items or buttons or by providing keystrokes. The invention could be implemented to receive user signals that are provided in other ways, such as by using user input circuitry other than a keyboard and a mouse.

The implementation described above obtains transform data by allowing a user to compare a training image as presented by a particular type of image output devices to the same training image as presented by a high resolution display alter each of a sequence of basic image processing operations. The invention could also be implemented by analyzing the structure of a type of image output devices to obtain transform data indicating an appropriate transform.

In the implementation described above, acts are performed in an order that could be modified. For example, in FIG. 12, transforms could be performed by an inner iterative loop between the acts in boxes 242 and 244 rather than in a separate branch from box 240. Similarly, the acts in FIG. 17 could be performed in a different order.

D. Application

The invention could be applied in many ways, including previewing for copiers and peripheral printers.

If the invention is applied in previewing for a copier, machine 180 in FIG. 11 could include image input circuitry 182, user input circuitry 184, processor 186, memory 190, and display 192 as shown. In addition, machine 180 could include scanner 212 and two or more image output devices 194 through 196, each of which is a printer or circuitry for connecting to a printer. The invention could be applied, for example, with a copier as described in copending, coassigned U.S. patent application Ser. No. 08/234,098, now U.S. Pat. No. 5,627,662, entitled "Digital Imaging System Using Two-Dimensional Input Sensor Array and Output Light Valve," incorporated herein by reference.

If the invention is applied in previewing for peripheral printers, machine 180 in FIG. 11 could include image input circuitry 182, user input circuitry 184, processor 186, memory 190, and display 192 as shown, all of which would be included in a workstation, personal computer, or other data processing system. In addition, machine 180 could include image output circuitry for connecting to two or more image output devices 194 through 196, each of which is a peripheral printer of a different type. The invention could be applied, for example, with a printer as described in copending, coassigned U.S. patent application Ser. No. 08/234,896, now issued as U.S. Pat. No. 5,745,156, entitled "Digital Printer Using Two-Dimensional, Full Frame Light Valve," incorporated herein by reference.

The technique in FIGS. 16–17 would be especially useful in a previewing application for a copier or a printer, and machine 300 could be a copier or a printer.

E. Miscellaneous

The invention has been described in relation to software implementations, but the invention might be implemented with specialized hardware. For example, the invention has been described in relation to implementations in which a processor executes instructions to perform transform operations. The invention might also be implemented with a specialized processor that performs such operations without executing instructions.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a system that includes:
    an active matrix liquid crystal display (AMLCD) for presenting output images in response to data defining the output images; the AMLCD including an array of light control units for causing presentation of images and signal circuitry for providing signals to the light control units in the array; the array extending in first and second directions, the second direction being perpendicular to the first direction; the light control units having a density of greater than 100/cm in both the first and second directions so that the array has sufficient resolution to present output images as they would appear on a first type of image output devices; the AMLCD being an instance of a second type of image output devices that is different than the first type; and
    starting image data, defining a starting image;
    the method comprising:
        using the starting image data to automatically obtain first device version data defining a first device version of the starting image that can be presented by the array to show the starting image as it would appear when presented by an image output device of the first type; and
        providing the first device version data to the signal circuitry so that the signal circuitry provides signals to the array and the array presents the first device version of the starting image, showing the starting image as it would appear when presented by an image output device of the first type.

2. A method of operating a system that includes:
    user input circuitry for providing signals from a user;
    a display for presenting output images in response to data defining the output images;
    the display having sufficient resolution to present output images as they would appear on any of a set of types of image output devices; the display being an instance of a type of image output devices that is different from any of the set of types; and
    starting image data defining a starting image; the set of types including two or more types;
    the method comprising a sequence of iterations; each iteration comprising:
        receiving a device signal from the user input circuitry; the device signal indicating one of the set of types of image output devices;
        in response to the iteration's device signal, using the starting image data to automatically obtain device version data; the iteration's device version data defining a device version of the starting image that can be presented on the display to show the starting image as it would appear when presented by an image output device of the type indicated by the iteration's device signal; and
        providing the iteration's device version data to the display so that the display presents the iteration's device version of the starting image, showing the starting image as it Would appear when presented by an image output device of the type indicated by the iteration's device signal;
    the sequence of iterations including a first iteration in which the device signal indicates a first one of the set of types and a second iteration in which the device signal indicates a second one of the set of types; the first and second types being different from each other.

3. The method of claim 2 in which each iteration further comprises:
    presenting two or more selectable units on the display, the two or more selectable units including first and second selectable units ; the first and second selectable units representing the first and second types, respectively;
    in each iteration, the act of receiving a device signal comprising:
        receiving a signal indicating selection of one of the selectable units.

4. The method of claim 3 in which the act of presenting two or more selectable units comprises:
    presenting, a menu on the display; the menu including the two or more selectable units.

5. The method of claim 2 in which each of the two or more selectable units is a button; the act of presenting two or more selectable units comprises:
    presenting, a set of two or more buttons on the display; each of the buttons being one of the two or more selectable units.

6. The method of claim 2 in which the system further includes device transform data that indicate, for each of the set of types of image output devices, a transform operation; the response to the iteration's device signal further comprising:

accessing the device transform data to identify the transform operation for the indicated type of image output device;

the act of obtaining the device version data comprising performing the indicated transform operation to obtain the device version data.

7. A method of operating a system that includes:

a display for presenting output images in response to data defining the output images;

the display including an array of light control units for causing presentation of images and signal circuitry for providing signals to the light control units in the array; the array having sufficient resolution to present output images as they would appear on a first type of image output devices; the display being an instance of a second type of image output devices that is different than the first type;

memory for storing data; and a processor connected for providing data defining output images to the signal circuitry and for accessing data stored in the memory;

the data stored in the memory including starting image data defining a starting image;

the method comprising:

operating the processor to access and use the starting image data to automatically obtain first device version data defining a first device version of the starting image that can be presented by the array to show the starting image as it would appear when presented by an image output device of the first type; and providing the first device version data to the signal circuitry so that the signal circuitry provides signals to the array and the array presents the first device version of the starting image, showing the starting image as it would appear when presented by an image output device of the first type.

8. A product comprising:

image input circuitry for providing data defining input images;

an active matrix liquid crystal display (AMLCD) for presenting output images in response to data defining the output images; the AMLCD including an array of light control units for causing presentation of images and signal circuitry for providing signals to the light control units in the array; the array extending in first and second directions, the second direction being perpendicular to the first direction; the light control units having a density of greater than 100/cm in both the first and second directions so that the array has sufficient resolution to present output images as they would appear on a first type of image output devices; the AMLCD being an instance of a second type of image output devices that is different than the fist type;

memory for storing data; and a processor connected for receiving data defining input images from the image input circuitry, for providing data defining output images to the signal circuitry, and for accessing data stored in the memory;

the data store in the memory comprising instruction data indicating instructions the processor can execute; the processor, in executing the instructions:

receiving input image data defining an input image from the image input circuitry and storing the input image data in the memory;

accessing and using the input image data to automatically obtain first device version data defining a first device version of the input image that can be presented by the array to show the input image as it would appear when presented by an image output device of the first type; and providing the first device version data to the signal circuitry so that the signal circuitry provides signals to the array and the array presents the first device version of the input image, showing the input image as it would appear when presented by an image output device of the first type.

9. The product of claim 8 in which the display comprises an active matrix liquid crystal display (AMLCD).

10. The product of claim 9 in which the AMLCD is a monochrome AMLCD.

11. The product of claim 9 in which the AMLCD is a color AMLCD.

12. The product of claim 8 in which the product is a copier.

13. The product of claim 8 in which the product is a printer.

14. The product of claim 8 in which the data stored in the memory further comprise:

first device transform data indicating a first device transform operation the processor can perform on data defining an image;

the processor, in using the input image data to automatically obtain first device version data:

accessing the first device transform data; and performing the first device transform operation on the input image data; the first device transform operation producing the first device version data.

15. The product of claim 14 in which the data stored in the memory further include default transform data indicating a default transform operation the processor can perform on data defining an image; the processor further, in executing the instructions:

using the input image data to automatically obtain default version data defining a default version of the input image that can be presented on the display to show the input image; and providing the default version data to the display so that the display presents the default version of the input image until the processor accesses and uses the input image data to automatically obtain first device version data.

16. The product of claim 8 in which the product further comprises an image output device of the first type; the processor further, in executing the instructions:

using the starting data to obtain output image data defining an output version of the starting image for presentation by the image output device; and providing the output image data to the image output device so that the image output device presents the output version of the starting image, the output version of the starting image being perceptible as substantially identical to the first device version of the starting image presented by the display.

17. A method of operating a system that includes:

printing circuitry for printing output images in response to data defining the output images; and display circuitry for presenting output images in response to data defining the output images; the display circuitry including an array of light control units for causing presentation of images and signal circuitry for providing signals to the light control units in the array; the array having sufficient resolution to present output images as they would appear when printed by the printing circuitry;

the method comprising:

obtaining display version data defining a display version of an image that can be presented by the array to show the image as it would appear when printed by the printing circuitry;

providing the display version data to the signal circuitry so that the signal circuitry provides signals to the array and the array presents the display version of the image, showing the image as it would appear when printed by the printing circuitry;

using the display version data to obtain print version data defining a print version of an image that can be printed by the printing circuitry; and providing the print version data to the printing circuitry so that the printing circuitry prints the print version of the image, the print version printed by the printing circuitry being substantially identical to the display version presented by the array.

18. A method of operating a system that includes:

a display for presenting output images in response to data defining the output images;

the display including an array of light control units for causing presentation of images and signal circuitry for providing signals to the light control units in the array; the array having sufficient resolution to present output images so that substantially all features and separations between features that are perceptible to most humans with normal vision when images are presented at usual viewing distances by a first type of image output devices are also perceptible to most humans with normal vision when the images are presented at usual viewing distances by the display; the display being an instance of a second type of image output devices that is different than the first type; and starting image data defining a starting image;

the method comprising:

using the starting image data to automatically obtain first device version data defining a first device version of the starting image that can be presented by the array to show the starting image so that substantially all features and separations between features that would be perceptible in the image to most humans with normal vision when presented at usual viewing distances by an image output device of the first type are perceptible to most humans with normal vision when the version is presented at usual viewing distances on the display; and providing the first device version data to the signal circuitry so that the signal circuitry provides signals to the array and the array presents the first device version of the starting image, showing the starting image so that substantially all features and separations between features that would be perceptible in the image to most humans with normal vision when presented at usual viewing distances by an image output device of the first type are perceptible to most humans with normal vision viewing the display at usual viewing distances.

19. The method of claim 18 in which the system further includes:

user input circuitry for providing signals from a user;

the method further comprising:

receiving a first signal from the user input circuitry;

the acts of using the starting image data to automatically obtain first device version data and providing the first device version data to the display being performed in response to the first signal.

20. The method of claim 19 in which the first signal indicates the first type of image output devices.

21. The method of claim 19 in which image output devices of the first type have a user changeable parameter of image presentation; the first signal indicating a change in the user changeable parameter; the method further comprising:

obtaining changed parameter data indicating a value of the user changeable parameter resulting from the change indicated by the first signal;

the act of using the starting image data to automatically obtain first device version data comprising:

using the changed parameter data to obtain the first device version data so that the first device version shows a version of the starting image that can be presented on the display to show the starting image so that substantially all features and separations between features that would be perceptible in the image to most humans with normal vision when presented at usual viewing distances by an image output device of the first type with the indicated value of the user changeable parameter are perceptible to most humans with normal vision viewing the display at usual viewing distances.

22. The method of claim 19 in which the act of receiving a first signal comprises receiving keystroke signals based on a sequence of keystrokes.

23. The method of claim 16 in which the system further includes an image output device of the first type; the method further comprising:

using the starting image data to obtain output image data defining an output version of the starting image for presentation by the image output device; and providing the output image data to the image output device so that the image output device presents the output version of the starting image, the output version of the starting image being perceptible as substantially identical to the first device version of the starting image presented by the display.

24. The method of claim 16 in which the system further includes an image output device of the first type; the method further comprising:

using the first device version data to obtain output image data defining an output version of the starting image for presentation by the image output device; and providing the output image data to the image output device so that the image output device presents the output version of the starting image, the output version of the starting image being perceptible as substantially identical to the first device version of the starting image presented by the display.

25. The method of claim 18 in which the system further includes:

memory for storing data; the starting image data being stored in the memory; and a processor connected for providing data defining output images to the display and for accessing data stored in the memory;

the data stored in the memory further including first device transform data indicating a first device transform operation the processor can perform on data defining an image;

the act of using the starting image data to automatically obtain first device version data comprising:

operating the processor to access the first device transform data; and operating the processor to perform the first device transform operation on the starting image data; the first device transform operation producing the first device version data.

26. The method of claim 25 in which the data stored in the memory further include default transform data indicating a default transform operation the processor can perform on data defining an image; the system further comprising user input circuitry for providing signals from a user; the method further comprising, before the act of using the starting image data to automatically obtain device version data:

using the starting image data to automatically obtain default version data defining a default version of the starting image that can be presented on the display to show the starting image;

providing the default version data to the display so that the display presents the default version of the starting image; and receiving a signal from the user input circuitry; the act of using the starting image data to automatically obtain device version data being performed in response to the signal.

27. The method of claim 18 in which the first type is a type of printers.

28. The method of claim 18 in which the first type is a type of displays.

29. A method of operating a system that includes:

user input circuitry for providing signals from a user;

a display for presenting output images in response to data defining the output images; the display having sufficient resolution to present output images so that substantially all features and separations between features that are perceptible to most humans with normal vision when images are presented at usual viewing distances by any of a set of types of image output devices are also perceptible to most humans with normal vision when the images are presented at usual viewing distances by the display; the display being an instance of a type of image output devices that is not in the set of types; the set of types including two or more types; and starting image data defining a starting image;

the method comprising a sequence of iterations; each iteration comprising:

receiving a device signal from the user input circuitry; the device signal indicating one of the set of types of image output devices;

in response to the iteration's device signal, using the starting image data to automatically obtain device version data; the iteration's device version data defining a device version of the starting image that can be presented on the display to show the starting image so that substantially all features and separations between features that would be perceptible in the image to most humans with normal vision when presented at usual viewing distances by an image output device of the type indicated by the iteration's device signal are perceptible to most humans with normal vision when the version is presented at usual viewing distances on the display; and providing the iteration's device version data to the display so that the display presents the iteration's device version of the starting image, showing the starting image so that substantially all features and separations between features that would be perceptible in the image to most humans with normal vision when presented at usual viewing distances by an image output device of the type indicated by the iteration's device signal are perceptible to most humans with normal vision viewing the display at usual viewing distances;

the sequence of iterations including a first iteration in which the device signal indicates a first one of the set of types and a second iteration in which the device signal indicates a second one of the set of types; the first and second types being different from each other.

30. The method of claim 29 in which the iterations include a final iteration; the system further including an image output device of the type indicated by the final iteration's device signal; the method further comprising, after the final iteration:

using the starting data to obtain output image data defining an output version of the starting image for presentation by the image output device; and providing the output image data to the image output device so that the image output device presents the output version of the starting image, the output version of the starting image being perceptible as substantially identical to the final iteration's device version of the starting image presented by the display.

31. A method of operating a system that includes:

user input circuitry for providing signals from a user;

printing circuitry for printing output images in response to data defining the output images; and display circuitry for presenting output images in response to data defining the output images; the display circuitry having sufficient resolution to present output images so that substantially all features and separations between features that are perceptible to most humans with normal vision when images are presented at usual viewing distances by the printing circuitry, are also perceptible to most humans with normal vision when the images are presented at usual viewing distances by the display circuitry;

the method comprising:

obtaining first display version data defining a first display version of an image that can be presented on the display circuitry to show the image so that substantially all features and separations between features that would be perceptible in the image to most humans with normal vision when presented at usual viewing distances by the printing circuitry operating with a default parameter value are perceptible to most humans with normal vision when the first display version is presented at usual viewing distances on the display circuitry;

providing the first display version data to the display circuitry so that the display circuitry presents the first display version of the image, showing the image so that substantially all features and separations between features that would be perceptible in the image to most humans with normal vision when presented at usual viewing distances by the printing circuitry operating with the default parameter value are perceptible to most humans with normal vision viewing the display circuitry at usual viewing distances;

while the display circuitry presents the first display version of the image, receiving a change parameter signal from the user indicating a changed parameter value for the printing circuitry;

in response to the change parameter signal from the user:

obtaining second version data defining a second display version of the image that can be presented on the display circuitry to show the image so that substantially all features and separations between features that would be perceptible in the image to most humans with normal vision when presented at usual viewing distances by the printing circuitry operating with the changed parameter value are perceptible to most humans with normal vision when the second display version is presented at usual viewing distances on the display circuitry; and providing the second display version data to the display circuitry so that the display circuitry presents the second display version of the image, showing the image so that substantially all features and separations between features that would be perceptible in the image to most humans with normal vision when presented at usual viewing distances by the printing circuitry operating with the changed parameter value are perceptible to most humans with normal vision viewing the display circuitry at usual viewing distances;

while the display circuitry presents the second display version of the image, receiving a print signal from the user indicating a request to print the image; in response to the print signal:

obtaining print version data defining a print version of the image that can be printed by the printing circuitry; and providing the print version data to the printing circuitry so that the print circuitry prints the print version of the image operating with the changed parameter value, the print version printed by the printing circuitry being perceptible as substantially identical to the second display version presented by the display circuitry.

32. The method of claim 31 in which the system further includes:

memory for storing data;

a processor connected for accessing data stored in the memory and for providing data to the display circuitry and to the printing circuitry;

image data stored in the memory; the image data defining the image; and transform data stored in the memory; the transform data indicating first, second, and third transforms;

the act of obtaining the first version display data comprising:

operating the processor to access the transform data and the image data; and operating the processor to perform the first transform indicated by the transform data on the image data to obtain the first version display data;

the act of obtaining the second version display data comprising:

operating the processor to access the transform data; and operating the processor to perform the second transform indicated by the transform data on the first version display data to obtain the second version display data;

the act of obtaining the print version data comprising:

operating the processor to access the transform data and the image data; and operating the processor to perform the third transform indicated by the transform data on the second version display data to obtain the print version data.

33. The method of claim 31 in which the act of obtaining print version data comprises:

using the second display version data to obtain the print version data.

34. An improvement in a machine that performs printing; the machine including:

image input circuitry for providing data defining input images;

user input circuitry for providing signals from a user;

display circuitry for presenting output images in response to data defining the output images;

printing circuitry for printing output images in response to data defining the output images; and processing circuitry connected for receiving data defining input images from the image input circuitry, for receiving user signals from the user input circuitry, and for providing data defining output images to the display circuitry and to the printing circuitry;

the improvement comprising:

the display circuitry comprising an array of light control units for causing presentation of images and signal circuitry for providing signals to the light control units in the array; the array having sufficient resolution to present output images as they would appear when printed by the printing circuitry; and the processing circuitry operating to:

receive input image data defining an input image from the image input circuitry;

use the input image data to automatically obtain display version data defining a display version of the input image that can be presented by the array to show the input image as it would appear when printed by the printing circuitry;

provide the display version data to the signal circuitry so that the signal circuitry provides signals to the array and the array presents the display version of the input image, showing the input image as it would appear when printed by the printing circuitry;

receive a print signal from the user input circuitry while the display version of the input image is presented by the array;

in response to the print signal, automatically obtain print version data defining a print version of the input image that can be printed by the printing circuitry; and provide the input version data to the printing circuitry so that the printing circuitry prints the print version of the input image; the print version of the input image being perceptible as substantially identical to the display version of the input image presented by the array.

35. The improvement of claim 34 in which the machine further includes memory; the improvement further comprising:

first parameter data stored in the memory indicating a first parameter value for the printing circuitry; and the processing circuitry, in using the input image data to automatically obtain display version data, operating to:

use the input image data and the first parameter value to obtain first version data defining a first version of the input image that can be presented on the display to show the input image as it would appear when printed by the printing circuitry operating with the first parameter value;

provide the first version data to the display circuitry so that the display presents the first version of the input image, showing the input image as it would appear when printed by the printing circuitry operating with the first parameter value;

receive a change signal from the user input circuitry indicating a changed parameter value for the printing circuitry; and in response to the change signal, automatically obtain second version data defining a second version of the input image that can be presented on the display to show the input image as it would appear when printed by the printing circuitry operating with the changed parameter value.

36. The improvement of claim 34 in which the processing circuitry, in automatically obtaining print version data, uses the display version data to obtain the print version data.

37. A method of operating a system that includes:

user input circuitry for providing signals from a user;

an image output device of a first type for presenting output images in response to data defining the output images; and a display for presenting output images in response to data defining the output images;

the display having sufficient resolution to present output images as they would appear when presented by the image output device; the display being an instance of a second type of image output devices that is different from the first type;

the method comprising:

obtaining first display version data defining a first display version of an image that can be presented on the display to show the image as it would appear when presented by the image output device operating with a first parameter value;

providing the first display version data to the display so that the display presents the first display version of the image, showing the image as it would appear when presented by the image output device operating with the first parameter value;

while the display presents the first display version of the image, receiving a change parameter signal from the user indicating a second parameter value for the image output device;

in response to the change parameter signal:

obtaining second display version data defining a second display version of the image that can be presented on the display to show the image as it would appear when presented by the image output device operating with the second parameter value; and providing the second display version data to the display so that the display presents the second display version of the image, showing the image as it would appear where presented by the image output device operating with the second parameter value;

while the display presents the second display version of the image, receiving a present signal from the user indicating a request to present the image on the image output device;

in response to the present signal:

obtaining presentation version data defining a presentation version of the image that can be presented by the image output device; and providing the presentation version data to the image output device so that the image output device presents the presentation version of the image operating with the second parameter value, the presentation version presented by the image output device being perceptible as substantially identical to the second display version presented by the display.

38. The method of claim 37 in which the image output device is a printer and the present signal indicates a request to print the image on the printer.

39. The method of claim 37 in which the system further includes transform data that indicate, for each of a set of parameter values, a transform operation; the second parameter value being one of the parameter values in the set; the response to the change parameter signal further comprising:

accessing the transform data to identify the transform operation for the second parameter value;

the act of obtaining the second version data comprising performing the indicated transform operation to obtain the second version data.

* * * * *